US007961199B2

(12) United States Patent
Kerofsky et al.

(10) Patent No.: US 7,961,199 B2
(45) Date of Patent: *Jun. 14, 2011

(54) METHODS AND SYSTEMS FOR IMAGE-SPECIFIC TONE SCALE ADJUSTMENT AND LIGHT-SOURCE CONTROL

(75) Inventors: Louis Joseph Kerofsky, Camas, WA (US); Scott J. Daly, Kalama, WA (US); Michiyuki Sugino, Chiba (JP)

(73) Assignee: Sharp Laboratories of America, Inc., Camas, WA (US)

( * ) Notice: Subject to any disclaimer, the term of this patent is extended or adjusted under 35 U.S.C. 154(b) by 864 days.

This patent is subject to a terminal disclaimer.

(21) Appl. No.: 11/224,792

(22) Filed: Sep. 12, 2005

(65) Prior Publication Data

US 2006/0119612 A1 Jun. 8, 2006

Related U.S. Application Data

(63) Continuation-in-part of application No. 11/154,053, filed on Jun. 15, 2005, and a continuation-in-part of application No. 11/154,054, filed on Jun. 15, 2005, and a continuation-in-part of application No. 11/154,052, filed on Jun. 15, 2005, now Pat. No. 7,800,577.

(60) Provisional application No. 60/670,749, filed on Apr. 11, 2005, provisional application No. 60/660,049, filed on Mar. 9, 2005, provisional application No. 60/632,776, filed on Dec. 2, 2004, provisional application No. 60/632,779, filed on Dec. 2, 2004, provisional application No. 60/710,927, filed on Aug. 23, 2005.

(51) Int. Cl.

| | |
|---|---|
| *G06T 15/50* | (2011.01) |
| *G06T 15/60* | (2006.01) |
| *G09G 5/02* | (2006.01) |

(52) U.S. Cl. ........................................ 345/590; 345/426

(58) Field of Classification Search .................. 345/426, 345/590

See application file for complete search history.

(56) References Cited

U.S. PATENT DOCUMENTS

| | | | |
|---|---|---|---|
| 4,020,462 | A | 4/1977 | Morrin |
| 4,196,452 | A | 4/1980 | Warren et al. |
| 4,223,340 | A | 9/1980 | Bingham et al. |
| 4,268,864 | A | 5/1981 | Green |
| 4,399,461 | A | 8/1983 | Powell |
| 4,402,006 | A | 8/1983 | Karlock |
| 4,523,230 | A | 6/1985 | Carlson et al. |
| 4,536,796 | A | 8/1985 | Harlan |
| 4,549,212 | A | 10/1985 | Bayer |

(Continued)

FOREIGN PATENT DOCUMENTS

| | | |
|---|---|---|
| EP | 963112 | 12/1999 |

(Continued)

OTHER PUBLICATIONS

U.S. Appl. No. 11/371,466—Office Action dated Apr. 11, 2008.

(Continued)

*Primary Examiner* — M Good Johnson

(74) *Attorney, Agent, or Firm* — Krieger Intellectual Property, Inc.; Scott C. Krieger

(57) ABSTRACT

Embodiments of the present invention comprise systems, methods and devices for adjusting image code values in conjunction with display light source illumination levels for enhanced image display.

14 Claims, 13 Drawing Sheets

U.S. PATENT DOCUMENTS 4,553,165 A 11/1985 Bayer
4,709,262 A 11/1987 Spieth et al.
4,847,603 A 7/1989 Blanchard
4,962,426 A 10/1990 Naoi et al.
5,025,312 A 6/1991 Faroudja
5,046,834 A 9/1991 Dietrich
5,081,529 A * 1/1992 Collette ........................ 358/504
5,176,224 A * 1/1993 Spector ........................... 186/52
5,218,649 A 6/1993 Kundu et al.
5,227,869 A 7/1993 Degawa
5,235,434 A 8/1993 Wober
5,260,791 A 11/1993 Lubin
5,270,818 A 12/1993 Ottenstein
5,389,978 A 2/1995 Jeong-Hun
5,526,446 A 6/1996 Adelson
5,528,257 A 6/1996 Okumura et al.
5,651,078 A 7/1997 Chan
5,696,852 A 12/1997 Minoura et al.
5,857,033 A 1/1999 Kim
5,912,992 A 6/1999 Sawanda et al.
5,920,653 A 7/1999 Silverstein
5,952,992 A 9/1999 Helms
5,956,014 A 9/1999 Kuriyama et al.
6,055,340 A 4/2000 Nagao
6,075,563 A * 6/2000 Hung ......................... 348/223.1
6,275,207 B1 8/2001 Nitta et al.
6,278,421 B1 8/2001 Ishida et al.
6,285,798 B1 9/2001 Lee
6,317,521 B1 11/2001 Gallagher et al.
6,424,730 B1 * 7/2002 Wang et al. ................... 382/128
6,445,835 B1 9/2002 Qian
6,504,953 B1 1/2003 Behrends
6,507,668 B1 1/2003 Park
6,516,100 B1 2/2003 Qian
6,546,741 B2 4/2003 Yun et al.
6,560,018 B1 5/2003 Swanson
6,573,961 B2 6/2003 Jiang et al.
6,583,579 B2 6/2003 Tsumura
6,593,934 B1 7/2003 Liaw et al.
6,594,388 B1 7/2003 Gindele et al.
6,600,470 B1 7/2003 Tsuda
6,618,042 B1 9/2003 Powell
6,618,045 B1 9/2003 Lin
6,628,823 B1 * 9/2003 Holm ............................ 382/162
6,677,959 B1 1/2004 James
6,728,416 B1 4/2004 Gallagher
6,753,835 B1 6/2004 Sakai
6,782,137 B1 8/2004 Avinash
6,788,280 B2 9/2004 Ham
6,795,063 B2 9/2004 Endo et al.
6,809,717 B2 10/2004 Terada et al.
6,809,718 B2 10/2004 Wei et al.
6,816,141 B1 * 11/2004 Fergason ........................ 345/88
6,816,156 B2 11/2004 Sukeno et al.
6,934,772 B2 8/2005 Bui et al.
7,006,688 B2 * 2/2006 Zaklika et al. ................ 382/165
7,010,160 B1 3/2006 Yoshida
7,068,328 B1 6/2006 Mino
7,088,388 B2 * 8/2006 MacLean et al. ............. 348/234
7,098,927 B2 8/2006 Daly et al.
7,110,062 B1 9/2006 Whitted et al.
7,142,218 B2 11/2006 Yoshida
7,142,712 B2 11/2006 Maruoka et al.
7,158,686 B2 * 1/2007 Gindele ......................... 382/274
7,176,878 B2 * 2/2007 Lew et al. ..................... 345/102
7,199,776 B2 * 4/2007 Ikeda et al. ..................... 345/89
7,202,458 B2 4/2007 Park
7,221,408 B2 5/2007 Kim
7,259,769 B2 8/2007 Diefenbaugh
7,287,860 B2 * 10/2007 Yoshida et al. ................. 353/31
7,289,154 B2 * 10/2007 Gindele ........................ 348/364
7,317,439 B2 1/2008 Hata et al.
7,330,287 B2 2/2008 Sharman
7,352,347 B2 4/2008 Fergason
7,352,352 B2 4/2008 Oh et al.
7,394,448 B2 7/2008 Park et al.
7,403,318 B2 7/2008 Miyazawa et al.
7,433,096 B2 * 10/2008 Chase et al. .................. 358/504
7,443,377 B2 10/2008 Kim
7,466,301 B2 * 12/2008 Sohn et al. .................... 345/102
7,532,239 B2 * 5/2009 Hayaishi .................... 348/223.1
7,564,438 B2 7/2009 Kao et al.
7,639,220 B2 * 12/2009 Yoshida et al. ................. 345/87
2001/0031084 A1 10/2001 Cannata et al.
2002/0008784 A1 1/2002 Shirata et al.
2002/0057238 A1 5/2002 Nitta
2002/0167629 A1 11/2002 Blanchard
2002/0181797 A1 12/2002 Young
2003/0001815 A1 1/2003 Cui
2003/0012437 A1 * 1/2003 Zaklika et al. ................ 382/169
2003/0051179 A1 3/2003 Tsirkel et al.
2003/0053690 A1 3/2003 Trifonov et al.
2003/0058464 A1 3/2003 Loveridge et al.
2003/0146919 A1 8/2003 Kawashima
2003/0169248 A1 9/2003 Kim
2003/0179213 A1 9/2003 Liu
2003/0193472 A1 10/2003 Powell
2003/0201968 A1 10/2003 Itoh
2003/0223634 A1 12/2003 Gallagher et al.
2003/0227577 A1 * 12/2003 Allen et al. ................... 348/742
2003/0235342 A1 12/2003 Gindele
2004/0001184 A1 1/2004 Gibbons et al.
2004/0081363 A1 4/2004 Gindele et al.
2004/0095531 A1 5/2004 Jiang et al.
2004/0113905 A1 6/2004 Mori et al.
2004/0113906 A1 6/2004 Lew
2004/0119950 A1 6/2004 Penn
2004/0130556 A1 7/2004 Nokiyama
2004/0160435 A1 8/2004 Cui et al.
2004/0170316 A1 9/2004 Saquib
2004/0198468 A1 10/2004 Patel et al.
2004/0201562 A1 10/2004 Funamoto
2004/0207609 A1 10/2004 Hata et al.
2004/0207635 A1 10/2004 Miller et al.
2004/0208363 A1 10/2004 Berge et al.
2004/0239612 A1 12/2004 Asao
2004/0257324 A1 12/2004 Hsu
2005/0001801 A1 1/2005 Kim
2005/0057484 A1 3/2005 Diefenbaugh et al.
2005/0104837 A1 5/2005 Baik
2005/0104839 A1 5/2005 Baik
2005/0104840 A1 5/2005 Sohn et al.
2005/0104841 A1 5/2005 Sohn et al.
2005/0117186 A1 6/2005 Li et al.
2005/0117798 A1 6/2005 Patton et al.
2005/0140616 A1 6/2005 Sohn et al.
2005/0140639 A1 6/2005 Oh et al.
2005/0147317 A1 7/2005 Daly et al.
2005/0152614 A1 7/2005 Daly et al.
2005/0184952 A1 8/2005 Konno
2005/0190142 A1 9/2005 Ferguson
2005/0195212 A1 9/2005 Kurumisawa
2005/0200868 A1 9/2005 Yoshida
2005/0232482 A1 10/2005 Ikeda et al.
2005/0244053 A1 11/2005 Hayaishi
2005/0248503 A1 11/2005 Schobben et al.
2005/0248593 A1 11/2005 Feng et al.
2005/0270265 A1 12/2005 Plut
2006/0012987 A9 * 1/2006 Ducharme et al. ............ 362/231
2006/0015758 A1 1/2006 Yoon
2006/0061563 A1 3/2006 Fleck
2006/0072158 A1 4/2006 Christie
2006/0077405 A1 4/2006 Topfer et al.
2006/0120489 A1 6/2006 Lee
2006/0146236 A1 7/2006 Wu et al.
2006/0174105 A1 8/2006 Park
2006/0209005 A1 9/2006 Pedram et al.
2006/0221046 A1 10/2006 Sato
2006/0238827 A1 10/2006 Ikeda
2006/0256840 A1 11/2006 Alt
2007/0002004 A1 1/2007 Woo
2007/0035565 A1 2/2007 Kerofsky
2007/0092139 A1 4/2007 Daly
2007/0097069 A1 5/2007 Kurokawa
2007/0103418 A1 5/2007 Ogino
2007/0126757 A1 6/2007 Itoh
2007/0146236 A1 6/2007 Kerofsky et al.

| | | | |
|---|---|---|---|
| 2007/0268524 A1 | 11/2007 | Nose | |
| 2008/0037867 A1 | 2/2008 | Lee | |
| 2008/0074372 A1 | 3/2008 | Baba | |
| 2008/0094426 A1 | 4/2008 | Kimpe | |
| 2008/0180373 A1 | 7/2008 | Mori | |
| 2008/0231581 A1 | 9/2008 | Fujine | |
| 2008/0238840 A1 | 10/2008 | Raman et al. | |
| 2009/0002285 A1 | 1/2009 | Baba | |
| 2009/0051714 A1 | 2/2009 | Ohhara | |
| 2009/0167658 A1 | 7/2009 | Yamane et al. | |
| 2009/0174636 A1 | 7/2009 | Kohashikawa et al. | |

FOREIGN PATENT DOCUMENTS

| | | |
|---|---|---|
| FR | 2782566 | 2/2000 |
| JP | 3284791 | 12/1991 |
| JP | 11194317 | 7/1999 |
| JP | 200056738 | 2/2000 |
| JP | 2000148072 | 5/2000 |
| JP | 2000259118 | 9/2000 |
| JP | 2001057650 | 2/2001 |
| JP | 2001083940 | 3/2001 |
| JP | 2001086393 | 3/2001 |
| JP | 2001298631 | 10/2001 |
| JP | 2002189450 | 7/2002 |
| JP | 2003259383 | 9/2003 |
| JP | 2003271106 | 9/2003 |
| JP | 2003316318 | 11/2003 |
| JP | 2004007076 | 1/2004 |
| JP | 200445634 | 2/2004 |
| JP | 2004133577 | 4/2004 |
| JP | 2004177547 | 6/2004 |
| JP | 2004272156 | 9/2004 |
| JP | 2004287420 | 10/2004 |
| JP | 2004325628 | 11/2004 |
| JP | 2005346032 | 12/2005 |
| JP | 2006042191 | 2/2006 |
| JP | 2006317757 | 11/2006 |
| JP | 2007093990 | 4/2007 |
| JP | 2007212628 | 8/2007 |
| JP | 2007272023 | 10/2007 |
| JP | 2007299001 | 11/2007 |
| WO | WO03039137 | 5/2003 |

OTHER PUBLICATIONS

International Application No. PCT/US05/043560 International Search Report.

International Application No. PCT/US05/043560 International Preliminary Examination Report.

International Application No. PCT/US05/043641 International Search Report.

International Application No. PCT/US05/043641 International Preliminary Examination Report.

International Application No. PCT/US05/043647 International Search Report.

International Application No. PCT/US05/043647 International Preliminary Examination Report.

International Application No. PCT/US05/043640 International Search Report.

International Application No. PCT/US05/043640 International Preliminary Examination Report.

International Application No. PCT/US05/043646 International Search Report.

International Application No. PCT/US05/043646 International Preliminary Examination Report.

U.S. Appl. No. 11/154,054—Office Action dated Mar. 25, 2008.

U.S. Appl. No. 11/293,066—Office Action dated Jan. 1, 2008.

U.S. Appl. No. 11/371,466—Office Action dated Oct. 5, 2007.

A. Iranli, W. Lee, and M. Pedram, "HVS-Aware Dynamic Backlight Scaling in TFT LCD's", Very Large Scale Integration (VLSI) Systems, IEEE Transactions vol. 14 No. 10 pp. 1103-1116, 2006.

L. Kerofsky and S. Daly "Brightness preservation for LCD backlight reduction" SID Symposium Digest vol. 37, 1242-1245 (2006).

L. Kerofsky and S. Daly "Addressing Color in brightness preservation for LCD backlight reduction" ADEAC 2006 pp. 159-162.

L. Kerofsky "LCD Backlight Selection through Distortion Minimization", IDW 2007 pp. 315-318.

International Application No. PCT/JP08/053895 International Search Report.

U.S. Appl. No. 11/154,054—Office Action dated Aug. 5, 2008.

U.S. Appl. No. 11/460,940—Office Action dated Aug. 7, 2008.

Wei-Chung Cheng and Massoud Pedram, "Power Minimization in a Backlit TFT-LCD Display by Concurrent Brightness and Contrast Scaling" IEEE Transactions on Consumer Electronics, Vo. 50, No. 1, Feb. 2004.

Insun Hwang, Cheol Woo Park, Sung Chul Kang and Dong Sik Sakong, "Image Synchronized Brightness Control" SID Symposium Digest 32, 492 (2001).

Inseok Choi, Hojun Shim and Naehyuck Chang, "Low-Power Color TFT LCD Display for Hand-Held Embedded Systems", In ISLPED, 2002.

A. Iranli, H. Fatemi, and M. Pedram, "HEBS: Histogram equalization for backlight scaling," Proc. of Design Automation and Test in Europe, Mar. 2005, pp. 346-351.

Chang, N., Choi, I., and Shim, H. 2004. DLS: dynamic backlight luminance scaling of liquid crystal display. IEEE Trans. Very Large Scale Integr. Syst. 12, 8 (Aug. 2004), 837-846.

S. Pasricha, M Luthra, S. Mohapatra, N. Dun, N. Venkatasubramanian, "Dynamic Backlight Adaptation for Low Power Handheld Devices," To appear in IEEE Design and Test (IEEE D&T), Special Issue on Embedded Systems for Real Time Embedded Systems, Sep. 2004. 8.

H. Shim, N. Chang, and M. Pedram, "A backlight power management framework for the battery-operated multi-media systems." IEEE Design and Test Magazine, Sep./Oct. 2004, pp. 388-396.

F. Gatti, A. Acquaviva, L. Benini, B. Ricco', "Low-Power Control Techniques for TFT LCD Displays," Compiler, Architectures and Synthesis of Embedded Systems, Oct. 2002.

Ki-Duk Kim, Sung-Ho Baik, Min-Ho Sohn, Jae-Kyung Yoon, Eui-Yeol Oh and In-Jae Chung, "Adaptive Dynamic Image Control for IPS-Mode LCD TV", SID Symposium Digest 35, 1548 (2004).

Raman and Hekstra, "Content Based Contrast Enhancement for Liquid Crystal Displays with Backlight Modulation", IEEE Transactions on Consumer Electronics, vol. 51, No. 1, Feb. 2005.

E.Y. Oh, S. H. Balik, M. H. Sohn, K. D. Kim, H. J. Hong, J.Y. Bang, K.J. Kwon, M.H. Kim, H. Jang, J.K. Yoon and I.J. Chung, "IPS-mode dynamic LCD-TV realization with low black luminance and high contrast by adaptive dynamic image control technology", Journal of the Society for Information Display, Mar. 2005, vol. 13, Issue 3, pp. 181-266.

Fabritus, Grigore, Muang, Loukusa, Mikkonen, "Towards energy aware system design", Online via Nokia (http://www.nokia.com/nokia/0,,53712,00.html).

Choi, I., Kim, H.S., Shin, H. and Chang, N. "LPBP: Low-power basis profile of the Java 2 micro edition" In Proceedings of the 2003 International Symposium on Low Power Electronics and Design (Seoul, Korea, Aug. 2003) ISLPED '03. ACM Press, New York, NY, p. 36-39.

International Application No. PCT/JP08/064669 International Search Report.

Richard J. Qian, et al, "Image Retrieval Using Blob Histograms", Proceeding of 2000 IEEE International Conference on Multimedia and Expo, vol. 1, Aug. 2, 2000, pp. 125-128.

U.S. Appl. No. 11/154,054—Office Action dated Dec. 30, 2008.

U.S. Appl. No. 11/154,053—Office Action dated Oct. 1, 2008.

U.S. Appl. No. 11/460,940—Notice of Allowance dated Dec. 15, 2008.

U.S. Appl. No. 11/202,903—Office Action dated Oct. 3, 2008.

U.S. Appl. No. 11/371,466—Office Action dated Sep. 23, 2008.

PCT App. No. PCT/JP2008/064669—Invitation to Pay Additional Fees dated Sep. 29, 2008.

PCT App. No. PCT/JP2008/069815—Invitation to Pay Additional Fees dated Dec. 5, 2005.

International Application No. PCT/JP08/069815 International Search Report.

International Application No. PCT/JP08/072215 International Search Report.

International Application No. PCT/JP08/073898 International Search Report.
International Application No. PCT/JP08/073146 International Search Report.
International Application No. PCT/JP08/072715 International Search Report.
International Application No. PCT/JP08/073020 International Search Report.
International Application No. PCT/JP08/072001 International Search Report.
International Application No. PCT/JP04/013856 International Search Report.
PCT App. No. PCT/JP08/071909—Invitation to Pay Additional Fees dated Jan. 13, 2009.
U.S. Appl. No. 11/154,052—Office Action dated Apr. 27, 2009.
U.S. Appl. No. 11/154,053—Office Action dated Jan. 26, 2009.
U.S. Appl. No. 11/202,903—Office Action dated Feb. 5, 2009.
U.S. Appl. No. 11/293,066—Office Action dated May 16, 2008.
U.S. Appl. No. 11/371,466—Office Action dated Apr. 14, 2009.
International Application No. PCT/JP08/071909 International Search Report.
PCT App. No. PCT/JP08/073020—Replacement Letter dated Apr. 21, 2009.
U.S. Appl. No. 11/564,203—Non-final Office Action dated Sep. 24, 2009.
U.S. Appl. No. 11/154,052—Non-final Office Action dated Nov. 10, 2009.
U.S. Appl. No. 11/154,054—Final Office Action dated Jun. 24, 2009.
U.S. Appl. No. 11/154,053—Non-final Office Action dated Jul. 23, 2009.
U.S. Appl. No. 11/202,903—Non-final Office Action dated Aug. 7, 2009.
U.S. Appl. No. 11/202,903—Final Office Action dated Dec. 28, 2009.
U.S. Appl. No. 11/371,466—Non-final Office Action dated Dec. 14, 2009.
U.S. Appl. No. 11/154,054—Non-final Office Action dated Jan. 7, 2009.
U.S. Appl. No. 11/293,562—Non-final Office Action dated Jan. 7, 2009.
U.S. Appl. No. 11/564,203—Notice of Allowance dated Apr. 2, 2010.
U.S. Appl. No. 11/154,052—Notice of Allowance dated May 21, 2010.
U.S. Appl. No. 11/154,053—Final Office Action dated Mar. 4, 2010.
U.S. Appl. No. 11/293,066—Non-Final Office Action dated Mar. 2, 2010.
U.S. Appl. No. 11/465,436—Notice of Allowance dated Apr. 20, 2010.
U.S. Appl. No. 11/680,539—Non-Final Office Action dated May 19, 2010.
U.S. Appl. No. 11/154,054—Final Office Action dated Aug. 9, 2010.
U.S. Appl. No. 11/293,562—Final Office Action dated Jul. 8, 2010.
U.S. Appl. No. 11/371,466—Notice of Allowance dated Jul. 13, 2010.
U.S. Appl. No. 11/460,907—Non-Final Office Action dated Aug. 30, 2010.
U.S. Appl. No. 11/293,066—Final Office Action dated Oct. 1, 2010.
U.S. Appl. No. 11/460,768—Non-Final Office Action dated Sep. 3, 2010.
U.S. Appl. No. 11/680,312—Non-Final Office Action dated Sep. 9, 2010.
U.S. Appl. No. 11/948,969—Non-Final Office Action dated Oct. 4, 2010.

* cited by examiner

METHODS AND SYSTEMS FOR IMAGE-SPECIFIC TONE SCALE ADJUSTMENT AND LIGHT-SOURCE CONTROL

RELATED REFERENCES

This application is a continuation-in-part of U.S. patent application Ser. No. 11/154,053, entitled "Methods and Systems for Enhancing Display Characteristics with High Frequency Contrast Enhancement," filed on Jun. 15, 2005; this application is also a continuation-in-part of U.S. patent application Ser. No. 11/154,054, entitled "Methods and Systems for Enhancing Display Characteristics with Frequency-Specific Gain," filed on Jun. 15, 2005; this application is also a continuation-in-part of U.S. patent application Ser. No. 11/154,052, entitled "Methods and Systems for Enhancing Display Characteristics," filed on Jun. 15, 2005 now U.S. Pat. No. 7,800,577; this application also claims the benefit of U.S. Provisional Patent Application No. 60/670,749, entitled "Brightness Preservation with Contrast Enhancement," filed on Apr. 11, 2005; this application also claims the benefit of U.S. Provisional Patent Application No. 60/660,049, entitled "Contrast Preservation and Brightness Preservation in Low Power Mode of a Backlit Display," filed on Mar. 9, 2005; this application also claims the benefit of U.S. Provisional Patent Application No. 60/632,776, entitled "Luminance Matching for Power Saving Mode in Backlit Displays," filed on Dec. 2, 2004; this application also claims the benefit of U.S. Provisional Patent Application No. 60/632,779, entitled "Brightness Preservation for Power Saving Modes in Backlit Displays," filed on Dec. 2, 2004; and this application also claims the benefit of U.S. Provisional Patent Application No. 60/710, 927, entitled "Image Dependent Backlight Modulation," filed on Aug. 23, 2005.

FIELD OF THE INVENTION

Embodiments of the present invention comprise methods and systems for enhancing the brightness, contrast and other qualities of a display by adjusting light-source levels and pixel values.

BACKGROUND

A typical display device displays an image using a fixed range of luminance levels. For many displays, the luminance range has 256 levels that are uniformly spaced from 0 to 255. Image code values are generally assigned to match these levels directly.

In many electronic devices with large displays, the displays are the primary power consumers. For example, in a laptop computer, the display is likely to consume more power than any of the other components in the system. Many displays with limited power availability, such as those found in battery-powered devices, may use several illumination or brightness levels to help manage power consumption. A system may use a full-power mode when it is plugged into a power source, such as A/C power, and may use a power-save mode when operating on battery power.

In some devices, a display may automatically enter a power-save mode, in which the display illumination is reduced to conserve power. These devices may have multiple power-save modes in which illumination is reduced in a step-wise fashion. Generally, when the display illumination is reduced, image quality drops as well. When the maximum luminance level is reduced, the dynamic range of the display is reduced and image contrast suffers. Therefore, the contrast and other image qualities are reduced during typical power-save mode operation.

Many display devices, such as liquid crystal displays (LCDs) or digital micro-mirror devices (DMDs), use light valves which are backlit, side-lit or front-lit in one way or another. In a backlit light valve display, such as an LCD, a backlight is positioned behind a liquid crystal panel. The backlight radiates light through the LC panel, which modulates the light to register an image. Both luminance and color can be modulated in color displays. The individual LC pixels modulate the amount of light that is transmitted from the backlight and through the LC panel to the user's eyes or some other destination. In some cases, the destination may be a light sensor, such as a coupled-charge device (CCD).

Some displays may also use light emitters to register an image. These displays, such as light emitting diode (LED) displays and plasma displays use picture elements that emit light rather than reflect light from another source.

SUMMARY

Some embodiments of the present invention comprise systems and methods for varying a light-valve-modulated pixel's luminance modulation level to compensate for a reduced light source illumination intensity or to improve the image quality at a fixed light source illumination level.

Some embodiments of the present invention may also be used with displays that use light emitters to register an image. These displays, such as light emitting diode (LED) displays and plasma displays use picture elements that emit light rather than reflect light from another source. Embodiments of the present invention may be used to enhance the image produced by these devices. In these embodiments, the brightness of pixels may be adjusted to enhance the dynamic range of specific image frequency bands, luminance ranges and other image subdivisions.

In some embodiments of the present invention, a display light source may be adjusted to different levels in response to image characteristics. When these light source levels change, the image code values may be adjusted to compensate for the change in brightness or otherwise enhance the image.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
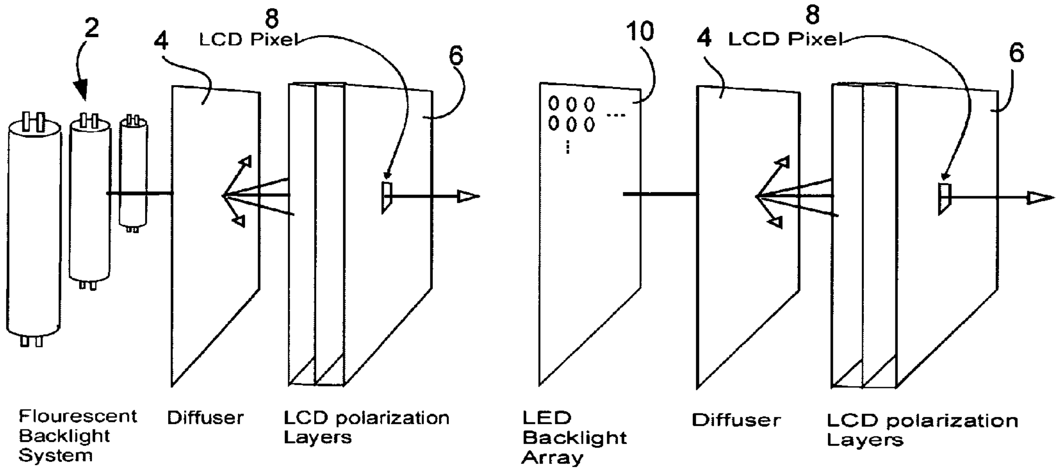
FIG. 1 is a diagram showing prior art backlit LCD systems.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Display devices using light valve modulators, such as LC modulators and other modulators may be reflective, wherein light is radiated onto the front surface (facing a viewer) and reflected back toward the viewer after passing through the modulation panel layer. Display devices may also be transmissive, wherein light is radiated onto the back of the modulation panel layer and allowed to pass through the modulation layer toward the viewer. Some display devices may also be transflexive, a combination of reflective and transmissive, wherein light may pass through the modulation layer from back to front while light from another source is reflected after entering from the front of the modulation layer. In any of these cases, the elements in the modulation layer, such as the individual LC elements, may control the perceived brightness of a pixel.

In backlit, front-lit and side-lit displays, the light source may be a series of fluorescent tubes, an LED array or some other source. Once the display is larger than a typical size of about 18", the majority of the power consumption for the device is due to the light source. For certain applications, and in certain markets, a reduction in power consumption is important. However, a reduction in power means a reduction in the light flux of the light source, and thus a reduction in the maximum brightness of the display.

A basic equation relating the current gamma-corrected light valve modulator's gray-level code values, CV, light source level, $L_{source}$, and output light level, $L_{out}$, is:

$$L_{out}=L_{source}*g(CV+\text{dark})^{\gamma}+\text{ambient} \tag{1}$$

Where g is a calibration gain, dark is the light valve's dark level, and ambient is the light hitting the display from the room conditions. From this equation, it can be seen that reducing the backlight light source by x% also reduces the light output by x%.

The reduction in the light source level can be compensated by changing the light valve's modulation values; in particular, boosting them. In fact, any light level less than (1−x%) can be reproduced exactly while any light level above (1−x%) cannot be reproduced without an additional light source or an increase in source intensity.

Setting the light output from the original and reduced sources gives a basic code value correction that may be used to correct code values for an x% reduction (assuming dark and ambient are 0) is:

$$L_{out}=L_{source}*g(CV)^{\gamma}=L_{reduced}*g(CV_{boost})^{\gamma} \tag{2}$$

$$CV_{boost}=CV*(L_{source}/L_{reduced})^{1/\gamma}=CV*(1/x\%)^{1/\gamma} \tag{3}$$

Figure 2A:
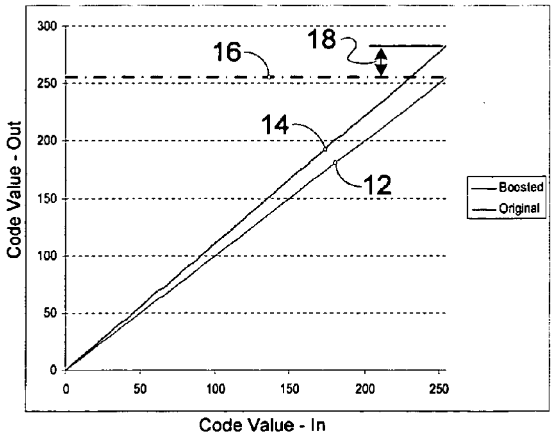
FIG. 2A is a chart showing the relationship between original image code values and boosted image code values.
Figure 2B:
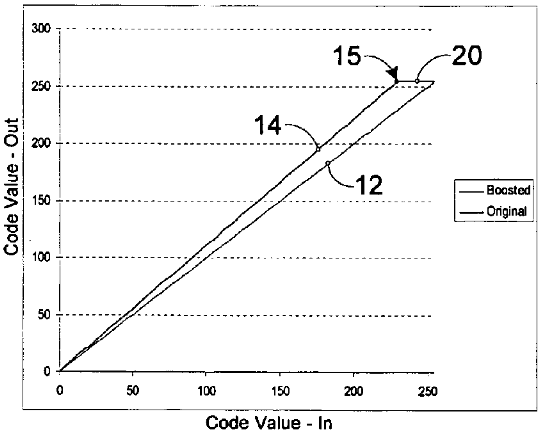
FIG. 2B is a chart showing the relationship between original image code values and boosted image code values with clipping.

FIG. 2A illustrates this adjustment. In FIGS. 2A and 2B, the original display values correspond to points along line 12. When the backlight or light source is placed in power-save mode and the light source illumination is reduced, the display code values need to be boosted to allow the light valves to counteract the reduction in light source illumination. These boosted values coincide with points along line 14. However, this adjustment results in code values 18 higher than the display is capable of producing (e.g., 255 for an 8 bit display). Consequently, these values end up being clipped 20 as illustrated in FIG. 2B. Images adjusted in this way may suffer from washed out highlights, an artificial look, and generally low quality.

Using this simple adjustment model, code values below the clipping point 15 (input code value 230 in this exemplary embodiment) will be displayed at a luminance level equal to the level produced with a full power light source while in a reduced source light illumination mode. The same luminance is produced with a lower power resulting in power savings. If the set of code values of an image are confined to the range below the clipping point 15 the power savings mode can be operated transparently to the user. Unfortunately, when values exceed the clipping point 15, luminance is reduced and detail is lost. Embodiments of the present invention provide an algorithm that can alter the LCD or light valve code values to provide increased brightness (or a lack of brightness reduction in power save mode) while reducing clipping artifacts that may occur at the high end of the luminance range.

Some embodiments of the present invention may eliminate the reduction in brightness associated with reducing display light source power by matching the image luminance displayed with low power to that displayed with full power for a significant range of values. In these embodiments, the reduction in source light or backlight power which divides the output luminance by a specific factor is compensated for by a boost in the image data by a reciprocal factor.

Ignoring dynamic range constraints, the images displayed under full power and reduced power may be identical because the division (for reduced light source illumination) and multiplication (for boosted code values) essentially cancel across a significant range. Dynamic range limits may cause clipping artifacts whenever the multiplication (for code value boost) of the image data exceeds the maximum of the display. Clipping artifacts caused by dynamic range constraints may be eliminated or reduced by rolling off the boost at the upper end of code values. This roll-off may start at a maximum fidelity point (MFP) above which the luminance is no longer matched to the original luminance.

In some embodiments of the present invention, the following steps may be executed to compensate for a light source illumination reduction or a virtual reduction for image enhancement:

1) A source light (backlight) reduction level is determined in terms of a percentage of luminance reduction;
2) A Maximum Fidelity Point (MFP) is determined at which a roll-off from matching reduced-power output to full-power output occurs;
3) Determine a compensating tone scale operator;
   a. Below the MFP, boost the tone scale to compensate for a reduction in display luminance;
   b. Above the MFP, roll off the tone scale gradually (in some embodiments, keeping continuous derivatives);
4) Apply tone scale mapping operator to image; and
5) Send to the display.

The primary advantage of these embodiments is that power savings can be achieved with only small changes to a narrow category of images. (Differences only occur above the MFP and consist of a reduction in peak brightness and some loss of bright detail). Image values below the MFP can be displayed in the power savings mode with the same luminance as the full power mode making these areas of an image indistinguishable from the full power mode.

Some embodiments of the present invention may use a tone scale map that is dependent upon the power reduction and display gamma and which is independent of image data. These embodiments may provide two advantages. Firstly, flicker artifacts which may arise due to processing frames differently do not arise, and, secondly, the algorithm has a very low implementation complexity. In some embodiments, an off-line tone scale design and on-line tone scale mapping may be used. Clipping in highlights may be controlled by the specification of the MFP.

Figure 3:
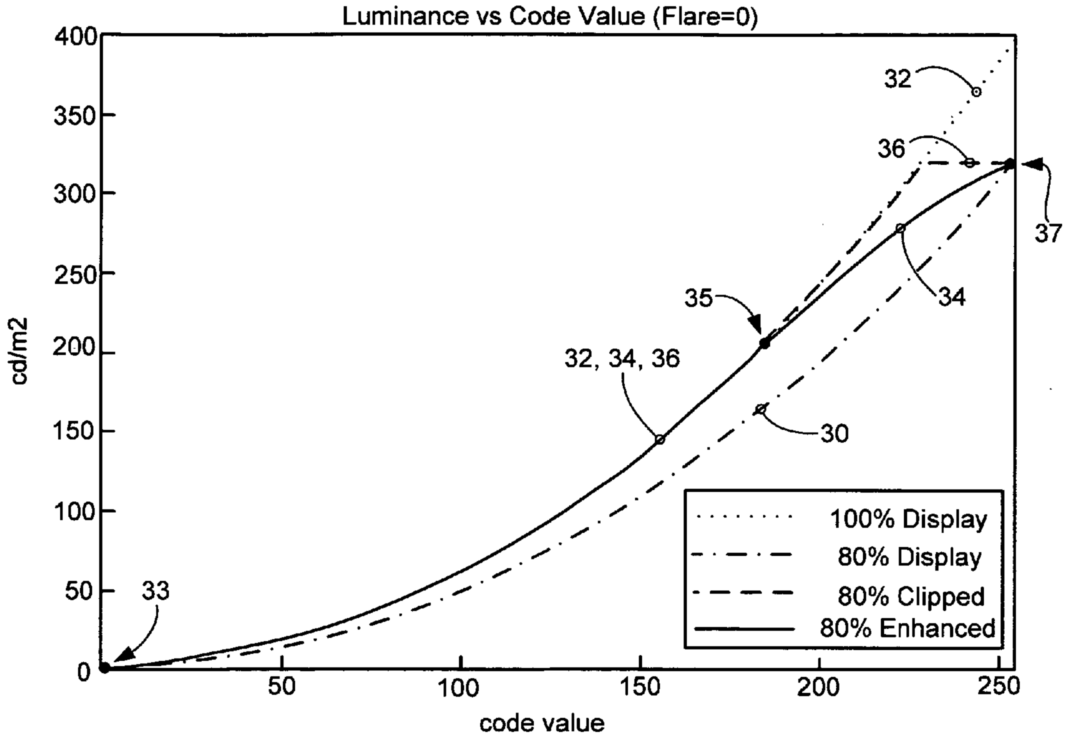
FIG. 3 is a chart showing the luminance level associated with code values for various code value modification schemes.

Some aspects of embodiments of the present invention may be described in relation to FIG. 3. FIG. 3 is a graph showing image code values plotted against luminance for several situations. A first curve 32, shown as dotted, represents the original code values for a light source operating at 100% power. A second curve 30, shown as a dash-dot curve, represents the luminance of the original code values when the light source operates at 80% of full power. A third curve 36, shown as a dashed curve, represents the luminance when code values are boosted to match the luminance provided at 100% light source illumination while the light source operates at 80% of full power. A fourth curve 34, shown as a solid line, represents the boosted data, but with a roll-off curve to reduce the effects of clipping at the high end of the data.

In this exemplary embodiment, shown in FIG. 3, an MFP 35 at code value 180 was used. Note that below code value 180, the boosted curve 34 matches the luminance output 32 by the original 100% power display. Above 180, the boosted curve smoothly transitions to the maximum output allowed on the 80% display. This smoothness reduces clipping and quantization artifacts. In some embodiments, the tone scale function may be defined piecewise to match smoothly at the transition point given by the MFP 35. Below the MFP 35, the boosted tone scale function may be used. Above the MFP 35, a curve is fit smoothly to the end point of boosted tone scale curve at the MFP and fit to the end point 37 at the maximum code value.

In some embodiments, the slope of the curve may be matched to the slope of the boosted tone scale curve/line at the MFP 35. This may be achieved by matching the slope of the line below the MFP to the slope of the curve above the MFP by equating the derivatives of the line and curve functions at the MFP and by matching the values of the line and curve functions at that point. Another constraint on the curve function may be that it be forced to pass through the maximum value point [255,255] 37. In some embodiments the slope of the curve may be set to 0 at the maximum value point 37. In some embodiments, an MFP value of 180 may correspond to a light source power reduction of 20%.

In some embodiments of the present invention, the tone scale curve may be defined by a linear relation with gain, g, below the Maximum Fidelity Point (MFP). The tone scale may be further defined above the MFP so that the curve and its first derivative are continuous at the MFP. This continuity implies the following form on the tone scale function:

$$y = \begin{cases} g \cdot x & x < MFP \\ C + B \cdot (x - MFP) + A \cdot (x - MFP)^2 & x \geq MFP \end{cases}$$

$$C = g \cdot MFP$$

$$B = g$$

$$A = \frac{\text{Max} - (C + B \cdot (\text{Max} - MFP)}{(\text{Max} - MFP)^2}$$

$$A = \frac{\text{Max} - g \cdot \text{Max}}{(\text{Max} - MFP)^2}$$

$$A = \frac{\text{Max} \cdot (1 - g)}{(\text{Max} - MFP)^2}$$

$$y = \begin{cases} g \cdot x & x < MFP \\ g \cdot x + \text{Max} \cdot (1 - g) \cdot \left(\frac{x - MFP}{\text{Max} - MFP}\right)^2 & x \geq MFP \end{cases}$$

The gain may be determined by display gamma and brightness reduction ratio as follows:

$$g = \left(\frac{FullPower}{ReducedPower}\right)^{\frac{1}{\gamma}}$$

In some embodiments, the MFP value may be tuned by hand balancing highlight detail preservation with absolute brightness preservation.

The MFP can be determined by imposing the constraint that the slope be zero at the maximum point. This implies:

$$\text{slope} = \begin{cases} g & x < MFP \\ g + 2\cdot \text{Max}\cdot(1-g)\cdot \dfrac{x - MFP}{(\text{Max} - MFP)^2} & x \geq MFP \end{cases}$$

$$\text{slope(Max)} = g + 2\cdot\text{Max}\cdot(1-g)\cdot\frac{\text{Max} - MFP}{(\text{Max} - MFP)^2}$$

$$\text{slope(Max)} = g + \frac{2\cdot\text{Max}\cdot(1-g)}{\text{Max} - MFP}$$

$$\text{slope(Max)} = \frac{g\cdot(\text{Max} - MFP) + 2\cdot\text{Max}\cdot(1-g)}{\text{Max} - MFP}$$

$$\text{slope(Max)} = \frac{2\cdot\text{Max} - g\cdot(\text{Max} + MFP)}{\text{Max} - MFP}$$

In some exemplary embodiments, the following equations may be used to calculate the code values for simple boosted data, boosted data with clipping and corrected data, respectively, according to an exemplary embodiment.

$$ToneScale_{boost}(cv) = (1/x)^{1/\gamma}\cdot cv$$

$$ToneScale_{clipped}(cv) = \begin{cases} (1/x)^{1/\gamma}\cdot cv & cv \leq 255\cdot(x)^{1/\gamma} \\ 255 & \text{otherwise} \end{cases}$$

$$ToneScale_{corrected}(cv) = \begin{cases} (1/x)^{1/\gamma}\cdot cv & cv \leq MFP \\ A\cdot cv^2 + B\cdot cv + C & \text{otherwise} \end{cases}$$

The constants A, B, and C may be chosen to give a smooth fit at the MFP and so that the curve passes through the point [255,255]. Plots of these functions are shown in FIG. 4.

Figure 4:
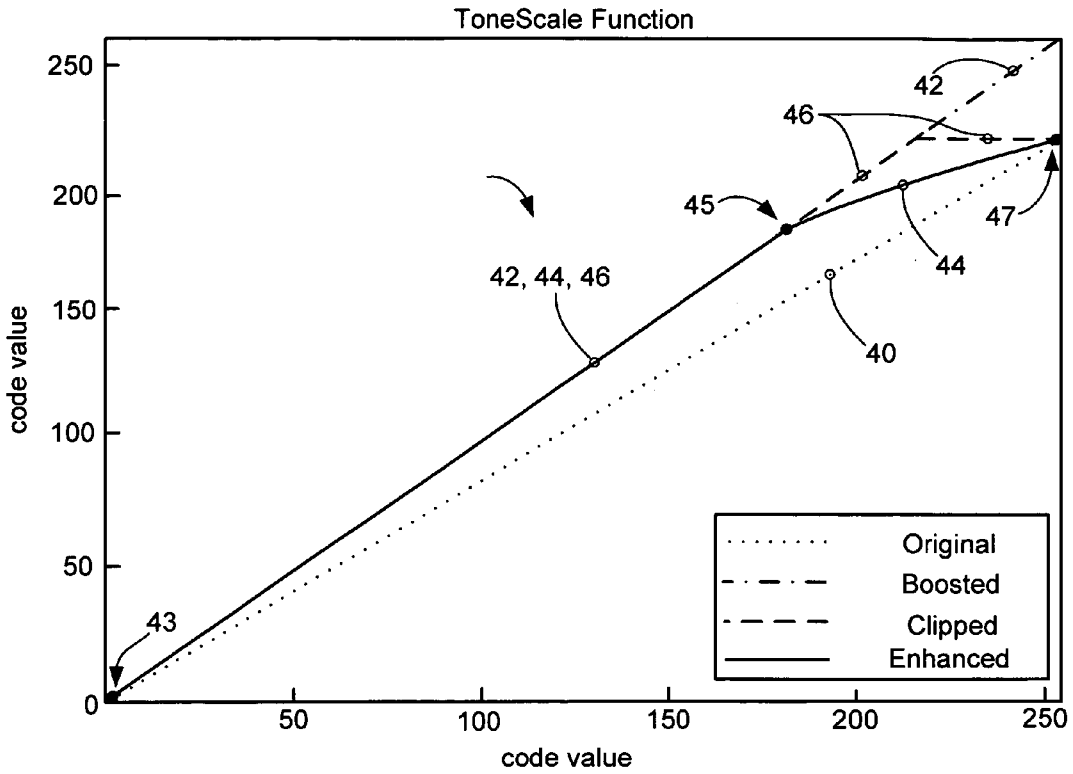
FIG. 4 is a chart showing the relationship between original image code values and modified image code values according to various modification schemes.

FIG. 4 is a plot of original code values vs. adjusted code values. Original code values are shown as points along original data line 40, which shows a 1:1 relationship between adjusted and original values as these values are original without adjustment. According to embodiments of the present invention, these values may be boosted or adjusted to represent higher luminance levels. A simple boost procedure according to the "tonescale boost" equation above, may result in values along boost line 42. Since display of these values will result in clipping, as shown graphically at line 46 and mathematically in the "tonescale clipped" equation above, the adjustment may taper off from a maximum fidelity point 45 along curve 44 to the maximum value point 47. In some embodiments, this relationship may be described mathematically in the "tonescale corrected" equation above.

Using these concepts, luminance values represented by the display with a light source operating at 100% power may be represented by the display with a light source operating at a lower power level. This is achieved through a boost of the tone scale, which essentially opens the light valves further to compensate for the loss of light source illumination. However, a simple application of this boosting across the entire code value range results in clipping artifacts at the high end of the range. To prevent or reduce these artifacts, the tone scale function may be rolled-off smoothly. This roll-off may be controlled by the MFP parameter. Large values of MFP give luminance matches over a wide interval but increase the visible quantization/clipping artifacts at the high end of code values.

Embodiments of the present invention may operate by adjusting code values. In a simple gamma display model, the scaling of code values gives a scaling of luminance values, with a different scale factor. To determine whether this relation holds under more realistic display models, we may consider the Gamma Offset Gain-Flair (GOG-F) model. Scaling the backlight power corresponds to linear reduced equations where a percentage, p, is applied to the output of the display, not the ambient. It has been observed that reducing the gain by a factor p is equivalent to leaving the gain unmodified and scaling the data, code values and offset, by a factor determined by the display gamma. Mathematically, the multiplicative factor can be pulled into the power function if suitably modified. This modified factor may scale both the code values and the offset.

$$L = G\cdot(CV + \text{dark})^{\gamma} + \text{ambient} \qquad \text{Equation 1 GOG-F model}$$

$$L_{\text{Linear reduced}} = p\cdot G\cdot(CV + \text{dark})^{\gamma} + \text{ambient}$$

$$L_{\text{Linear reduced}} = G\cdot(p^{1/\gamma}\cdot(CV + \text{dark}))^{\gamma} + \text{ambient}$$

$$L_{\text{Linear reduced}} = G\cdot(p^{1/\gamma}CV + p^{1/\gamma}\cdot\text{dark})^{\gamma} + \text{ambient} \qquad \text{Equation 2 Linear Luminance Reduction}$$

$$L_{CV\ \text{reduced}} = G\cdot(p^{1/\gamma}\cdot CV + \text{dark})^{\gamma} + \text{ambient} \qquad \text{Equation 3 Code Value Reduction}$$

Figure 5:
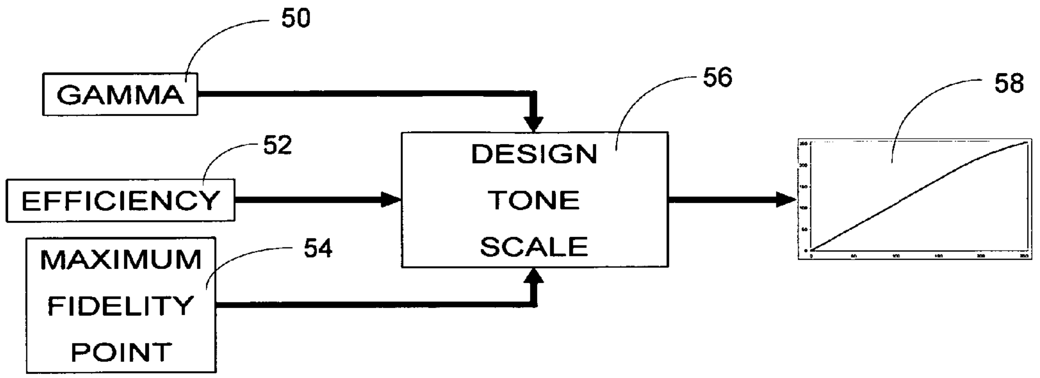
FIG. 5 is a diagram showing the generation of an exemplary tone scale adjustment model.

Some embodiments of the present invention may be described with reference to FIG. 5. In these embodiments, a tone scale adjustment may be designed or calculated off-line, prior to image processing, or the adjustment may be designed or calculated on-line as the image is being processed. Regardless of the timing of the operation, the tone scale adjustment 56 may be designed or calculated based on at least one of a display gamma 50, an efficiency factor 52 and a maximum fidelity point (MFP) 54. These factors may be processed in the tone scale design process 56 to produce a tone scale adjustment model 58. The tone scale adjustment model may take the form of an algorithm, a look-up table (LUT) or some other model that may be applied to image data.

Figure 6:
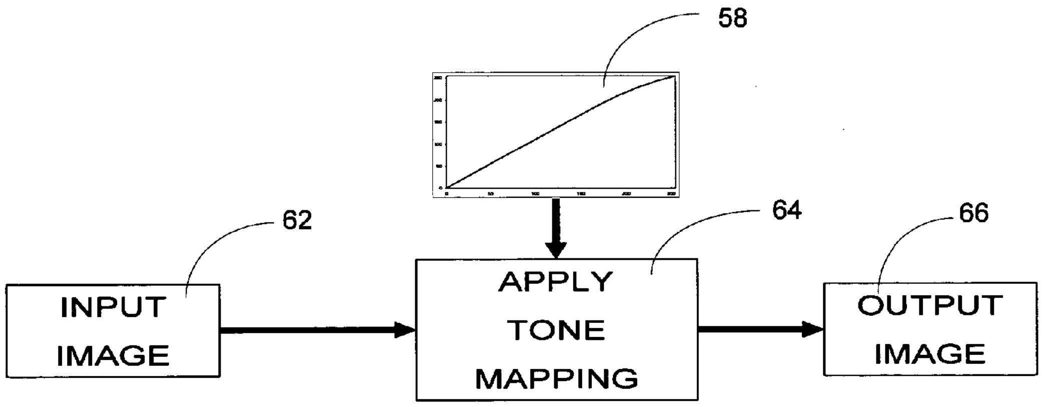
FIG. 6 is a diagram showing an exemplary application of a tone scale adjustment model.

Once the adjustment model 58 has been created, it may be applied to the image data. The application of the adjustment model may be described with reference to FIG. 6. In these embodiments, an image is input 62 and the tone scale adjustment model 58 is applied 64 to the image to adjust the image code values. This process results in an output image 66 that may be sent to a display. Application 64 of the tone scale adjustment is typically an on-line process, but may be performed in advance of image display when conditions allow.

Some embodiments of the present invention comprise systems and methods for enhancing images displayed on displays using light-emitting pixel modulators, such as LED displays, plasma displays and other types of displays. These same systems and methods may be used to enhance images displayed on displays using light-valve pixel modulators with light sources operating in full power mode or otherwise.

These embodiments work similarly to the previously-described embodiments, however, rather than compensating for a reduced light source illumination, these embodiments simply increase the luminance of a range of pixels as if the light source had been reduced. In this manner, the overall brightness of the image is improved.

In these embodiments, the original code values are boosted across a significant range of values. This code value adjustment may be carried out as explained above for other embodiments, except that no actual light source illumination reduction occurs. Therefore, the image brightness is increased significantly over a wide range of code values.

Some of these embodiments may be explained with reference to FIG. 3 as well. In these embodiments, code values for an original image are shown as points along curve 30. These values may be boosted or adjusted to values with a higher luminance level. These boosted values may be represented as points along curve 34, which extends from the zero point 33 to the maximum fidelity point 35 and then tapers off to the maximum value point 37.

Some embodiments of the present invention comprise an unsharp masking process. In some of these embodiments the unsharp masking may use a spatially varying gain. This gain may be determined by the image value and the slope of the modified tone scale curve. In some embodiments, the use of a gain array enables matching the image contrast even when the image brightness cannot be duplicated due to limitations on the display power.

Some embodiments of the present invention may take the following process steps:

1. Compute a tone scale adjustment model;
2. Compute a High Pass image;
3. Compute a Gain array;
4. Weight High Pass Image by Gain;
5. Sum Low Pass Image and Weighted High Pass Image; and
6. Send to the display Other embodiments of the present invention may take the following process steps:

1. Compute a tone scale adjustment model;
2. Compute Low Pass image;
3. Compute High Pass image as difference between Image and Low Pass image;
4. Compute Gain array using image value and slope of modified Tone Scale Curve;
5. Weight High Pass Image by Gain;
6. Sum Low Pass Image and Weighted High Pass Image; and
7. Send to the reduced power display.

Using some embodiments of the present invention, power savings can be achieved with only small changes on a narrow category of images. (Differences only occur above the MFP and consist of a reduction in peak brightness and some loss of bright detail). Image values below the MFP can be displayed in the power savings mode with the same luminance as the full power mode making these areas of an image indistinguishable from the full power mode. Other embodiments of the present invention improve this performance by reducing the loss of bright detail.

These embodiments may comprise spatially varying unsharp masking to preserve bright detail. As with other embodiments, both an on-line and an off-line component may be used. In some embodiments, an off-line component may be extended by computing a gain map in addition to the Tone Scale function. The gain map may specify an unsharp filter gain to apply based on an image value. A gain map value may be determined using the slope of the Tone Scale function. In some embodiments, the gain map value at a particular point "P" may be calculated as the ratio of the slope of the Tone Scale function below the MFP to the slope of the Tone Scale function at point "P." In some embodiments, the Tone Scale function is linear below the MFP, therefore, the gain is unity below the MFP.

Figure 7:
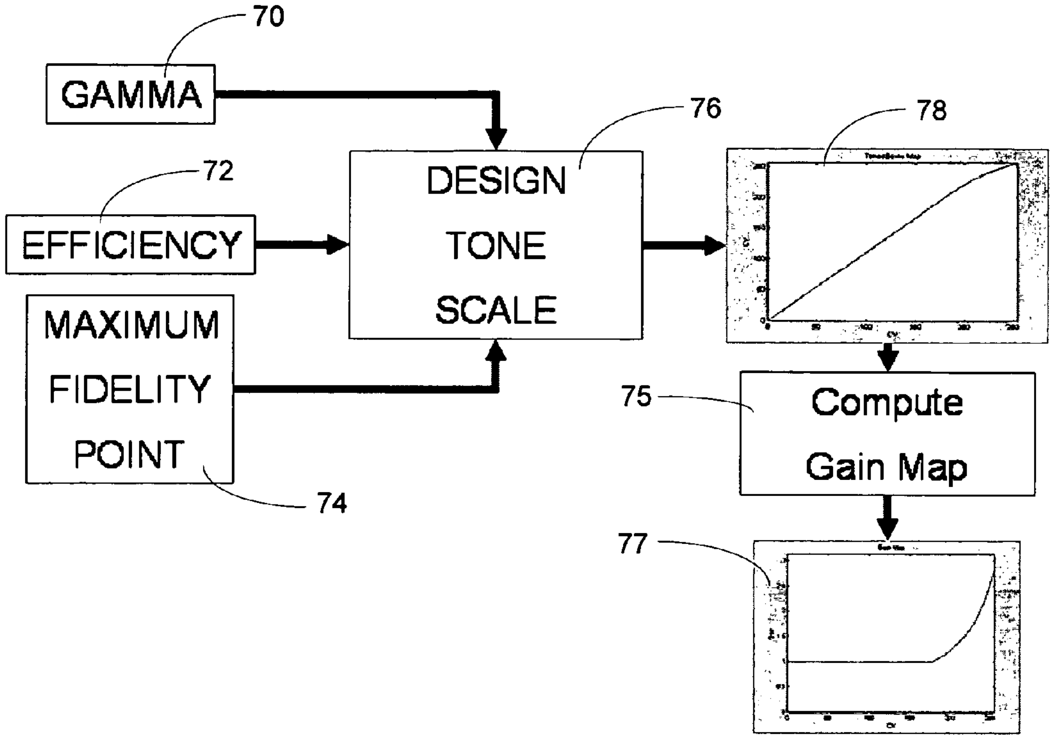
FIG. 7 is a diagram showing the generation of an exemplary tone scale adjustment model and gain map.

Some embodiments of the present invention may be described with reference to FIG. 7. In these embodiments, a tone scale adjustment may be designed or calculated off-line, prior to image processing, or the adjustment may be designed or calculated on-line as the image is being processed. Regardless of the timing of the operation, the tone scale adjustment 76 may be designed or calculated based on at least one of a display gamma 70, an efficiency factor 72 and a maximum fidelity point (MFP) 74. These factors may be processed in the tone scale design process 76 to produce a tone scale adjustment model 78. The tone scale adjustment model may take the form of an algorithm, a look-up table (LUT) or some other model that may be applied to image data as described in relation to other embodiments above. In these embodiments, a separate gain map 77 is also computed 75. This gain map 77 may be applied to specific image subdivisions, such as frequency ranges. In some embodiments, the gain map may be applied to frequency-divided portions of an image. In some embodiments, the gain map may be applied to a high-pass image subdivision. It may also be applied to specific image frequency ranges or other image subdivisions.

Figure 8:
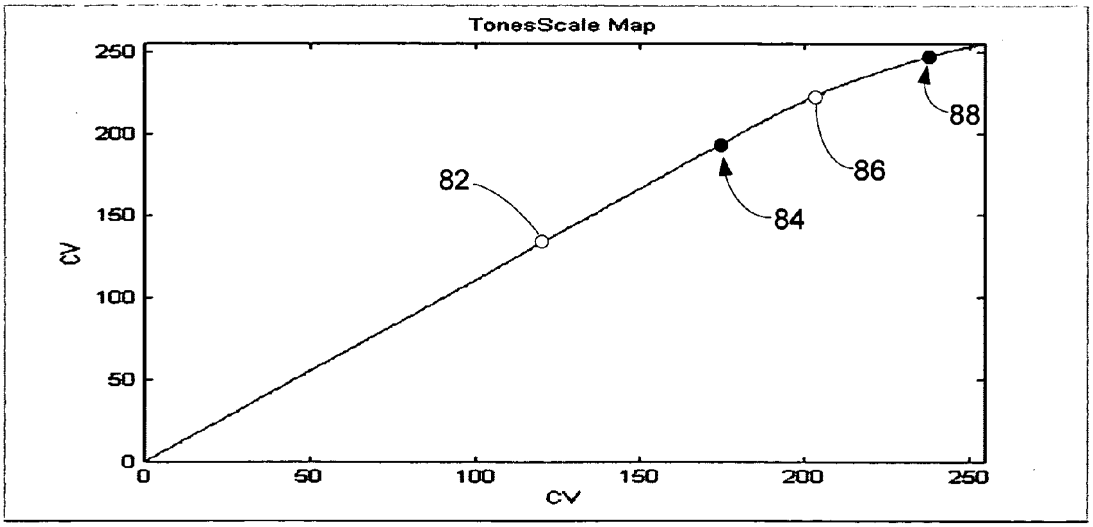
FIG. 8 is a chart showing an exemplary tone scale adjustment model.

An exemplary tone scale adjustment model may be described in relation to FIG. 8. In these exemplary embodiments, a Function Transition Point (FTP) 84 (similar to the MFP used in light source reduction compensation embodiments) is selected and a gain function is selected to provide a first gain relationship 82 for values below the FTP 84. In some embodiments, the first gain relationship may be a linear relationship, but other relationships and functions may be used to convert code values to enhanced code values. Above the FTP 84, a second gain relationship 86 may be used. This second gain relationship 86 may be a function that joins the FTP 84 with a maximum value point 88. In some embodiments, the second gain relationship 86 may match the value and slope of the first gain relationship 82 at the FTP 84 and pass through the maximum value point 88. Other relationships, as described above in relation to other embodiments, and still other relationships may also serve as a second gain relationship 86.

In some embodiments, a gain map 77 may be calculated in relation to the tone scale adjustment model, as shown in FIG. 8. An exemplary gain map 77, may be described in relation to FIG. 9. In these embodiments, a gain map function relates to the tone scale adjustment model 78 as a function of the slope of the tone scale adjustment model. In some embodiments, the value of the gain map function at a specific code value is determined by the ratio of the slope of the tone scale adjustment model at any code value below the FTP to the slope of the tone scale adjustment model at that specific code value. In some embodiments, this relationship may be expressed mathematically in the following equation:

$$\mathrm{Gain}(cv) = \frac{ToneScaleSlope(1)}{ToneScaleSlope(cv)}$$

In these embodiments, the gain map function is equal to one below the FTP where the tone scale adjustment model results in a linear boost. For code values above the FTP, the gain map function increases quickly as the slope of the tone scale adjustment model tapers off. This sharp increase in the gain map function enhances the contrast of the image portions to which it is applied.

Figure 9:
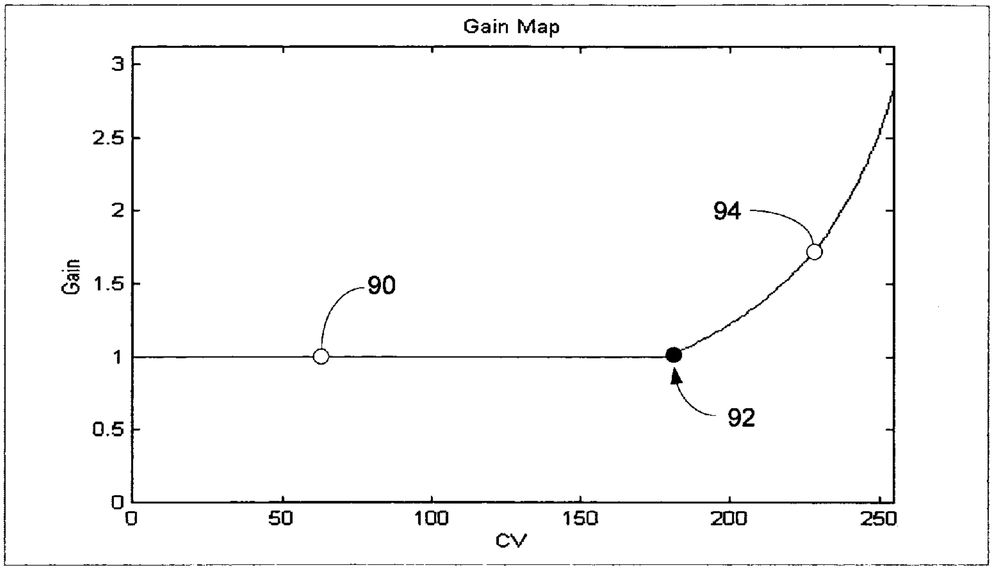
FIG. 9 is a chart showing an exemplary gain map.

The exemplary tone scale adjustment factor illustrated in FIG. 8 and the exemplary gain map function illustrated in FIG. 9 were calculated using a display percentage (source light reduction) of 80%, a display gamma of 2.2 and a Maximum Fidelity Point of 180.

In some embodiments of the present invention, an unsharp masking operation may be applied following the application of the tone scale adjustment model. In these embodiments, artifacts are, reduced with the unsharp masking technique.

Figure 10:
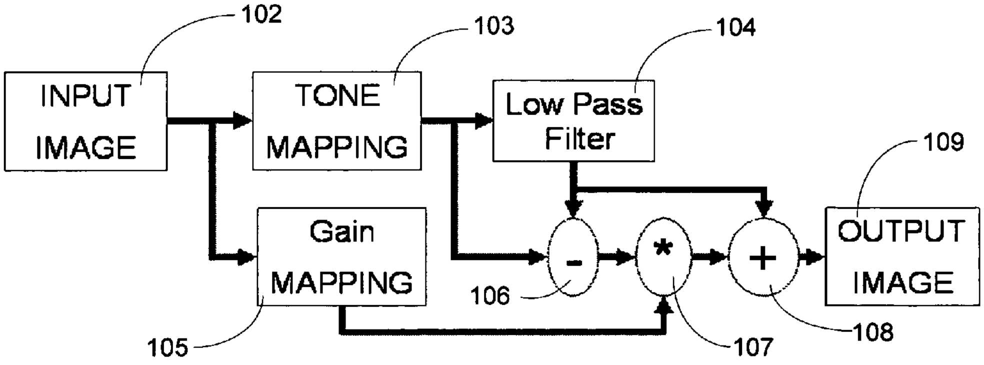
FIG. 10 is a flow chart showing an exemplary process wherein a tone scale adjustment model and gain map are applied to an image.

Some embodiments of the present invention may be described in relation to FIG. 10. In these embodiments, an original image 102 is input and a tone scale adjustment model 103 is applied to the image. The original image 102 is also used as input to a gain mapping process 105 which results in a gain map. The tone scale adjusted image is then processed through a low pass filter 104 resulting in a low-pass adjusted image. The low pass adjusted image is then subtracted 106 from the tone scale adjusted image to yield a high-pass adjusted image. This high-pass adjusted image is then multiplied 107 by the appropriate value in the gain map to provide a gain-adjusted high-pass image which is then added 108 to the low-pass adjusted image, which has already been adjusted with the tone scale adjustment model. This addition results in an output image 109 with increased brightness and improved high-frequency contrast.

In some of these embodiments, for each component of each pixel of the image, a gain value is determined from the Gain map and the image value at that pixel. The original image 102, prior to application of the tone scale adjustment model, may be used to determine the Gain. Each component of each pixel of the high-pass image may also be scaled by the corresponding gain value before being added back to the low pass image. At points where the gain map function is one, the unsharp masking operation does not modify the image values. At points where the gain map function exceeds one, the contrast is increased.

Some embodiments of the present invention address the loss of contrast in high-end code values, when increasing code value brightness, by decomposing an image into multiple frequency bands. In some embodiments, a Tone Scale Function may be applied to a low-pass band increasing the brightness of the image data to compensate for source-light luminance reduction on a low power setting or simply to increase the brightness of a displayed image. In parallel, a constant gain may be applied to a high-pass band preserving the image contrast even in areas where the mean absolute brightness is reduced due to the lower display power. The operation of an exemplary algorithm is given by:

1. Perform frequency decomposition of original image
2. Apply brightness preservation, Tone Scale Map, to a Low Pass Image
3. Apply constant multiplier to High Pass Image
4. Sum Low Pass and High Pass Images
5. Send result to the display The Tone Scale Function and the constant gain may be determined off-line by creating a photometric match between the full power display of the original image and the low power display of the process image for source-light illumination reduction applications. The Tone Scale Function may also be determined off-line for brightness enhancement applications.

For modest MFP values, these constant-high-pass gain embodiments and the unsharp masking embodiments are nearly indistinguishable in their performance. These constant-high-pass gain embodiments have three main advantages compared to the unsharp masking embodiments: reduced noise sensitivity, ability to use larger MFP/FTP and use of processing steps currently in the display system. The unsharp masking embodiments use a gain which is the inverse of the slope of the Tone Scale Curve. When the slope of this curve is small, this gain incurs a large amplifying noise. This noise amplification may also place a practical limit on the size of the MFP/FTP. The second advantage is the ability to extend to arbitrary MFP/FTP values. The third advantage comes from examining the placement of the algorithm within a system. Both the constant-high-pass gain embodiments and the unsharp masking embodiments use frequency decomposition. The constant-high-pass gain embodiments perform this operation first while some unsharp masking embodiments first apply a Tone Scale Function before the frequency decomposition. Some system processing such as de-contouring will perform frequency decomposition prior to the brightness preservation algorithm. In these cases, that frequency decomposition can be used by some constant-high-pass embodiments thereby eliminating a conversion step while some unsharp masking embodiments must invert the frequency decomposition, apply the Tone Scale Function and perform additional frequency decomposition.

Some embodiments of the present invention prevent the loss of contrast in high-end code values by splitting the image based on spatial frequency prior to application of the tone scale function. In these embodiments, the tone scale function with roll-off may be applied to the low pass (LP) component of the image. In light-source illumination reduction compensation applications, this will provide an overall luminance match of the low pass image components. In these embodiments, the high pass (HP) component is uniformly boosted (constant gain). The frequency-decomposed signals may be recombined and clipped as needed. Detail is preserved since the high pass component is not passed through the roll-off of the tone scale function. The smooth roll-off of the low pass tone scale function preserves head room for adding the boosted high pass contrast. Clipping that may occur in this final combination has not been found to reduce detail significantly.

Figure 11:
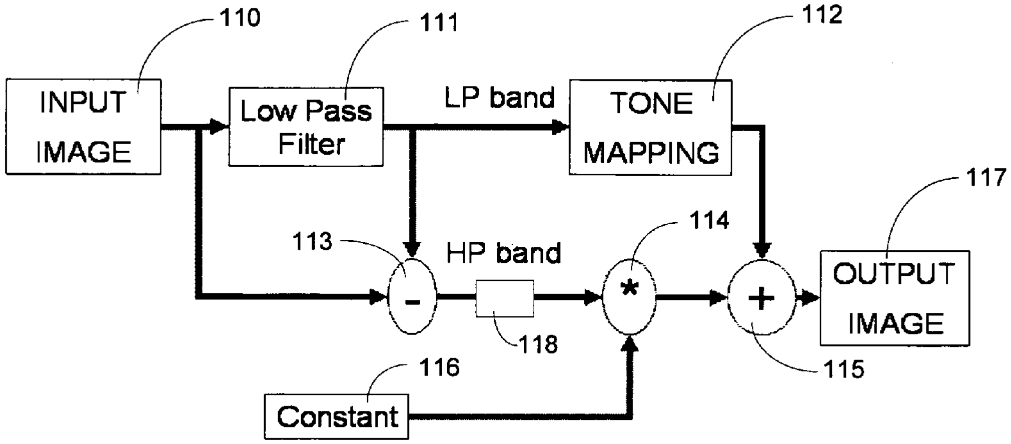
FIG. 11 is a flow chart showing an exemplary process wherein a tone scale adjustment model is applied to one frequency band of an image and a gain map is applied to another frequency band of the image.

Some embodiments of the present invention may be described with reference to FIG. 11. These embodiments comprise frequency splitting or decomposition 111, low-pass tone scale mapping 112, constant high-pass gain or boost 116 and summation or re-combination 115 of the enhanced image components.

In these embodiments, an input image 110 is decomposed into spatial frequency bands 111. In an exemplary embodiment, in which two bands are used, this may be performed using a low-pass (LP) filter 111. The frequency division is performed by computing the LP signal via a filter 111 and subtracting 113 the LP signal from the original to form a high-pass (HP) signal 118. In an exemplary embodiment, spatial 5×5 rect filter may be used for this decomposition though another filter may be used.

The LP signal may then be processed by application of tone scale mapping as discussed for previously described embodiments. In an exemplary embodiment, this may be achieved with a Photometric matching LUT. In these embodiments, a higher value of MFP/FTP can be used compared to some previously described unsharp masking embodiment since most detail has already been extracted in filtering 111. Clipping should not generally be used since some head room should typically be preserved in which to add contrast.

Figure 12:
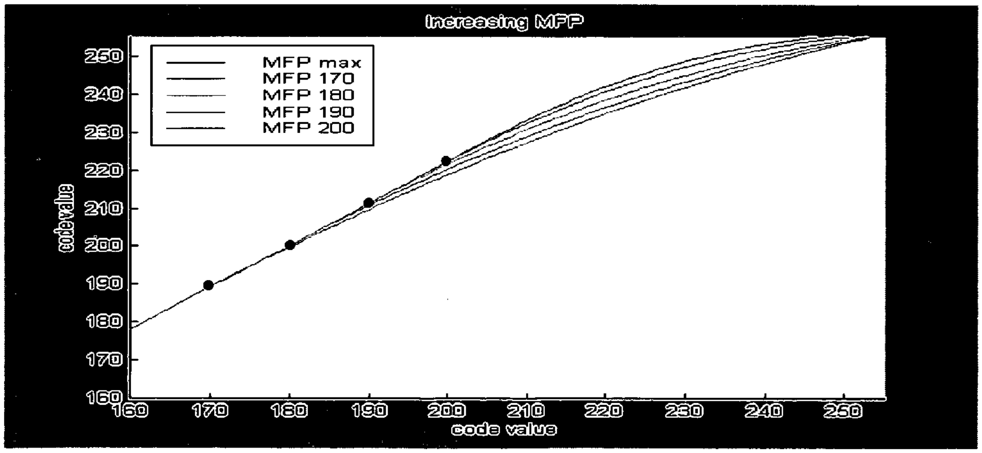
FIG. 12 is a chart showing tone scale adjustment model variations as the MFP changes.

In some embodiments, the MFP/FTP may be determined automatically and may be set so that the slope of the Tone Scale Curve is zero at the upper limit. A series of tone scale functions determined in this manner are illustrated in FIG. 12. In these embodiments, the maximum value of MFP/FTP may be determined such that the tone scale function has slope zero at 255. This is the largest MFP/FTP value that does not cause clipping.

In some embodiments of the present invention, described with reference to FIG. 11, processing the HP signal 118 is independent of the choice of MFP/FTP used in processing the low pass signal. The HP signal 118 is processed with a constant gain 116 which will preserve the contrast when the power/light-source illumination is reduced or when the image code values are otherwise boosted to improve brightness. The formula for the HP signal gain 116 in terms of the full and reduced backlight powers (BL) and display gamma is given immediately below as a high pass gain equation. The HP contrast boost is robust against noise since the gain is typically small (e.g. gain is 1.1 for 80% power reduction and gamma 2.2).

$$HighPassGain = \left(\frac{BL_{Full}}{BL_{Reduced}}\right)^{1/\gamma}$$

In some embodiments, once the tone scale mapping 112 has been applied to the LP signal, through LUT processing or otherwise, and the constant gain 116 has been applied to the HP signal, these frequency components may be summed 115 and, in some cases, clipped. Clipping may be necessary when the boosted HP value added to the LP value exceeds 255. This will typically only be relevant for bright signals with high contrast. In some embodiments, the LP signal is guaranteed not to exceed the upper limit by the tone scale LUT construction. The HP signal may cause clipping in the sum, but the negative values of the HP signal will never clip maintaining some contrast even when clipping does occur.

Image-Dependent Source Light Embodiments

In some embodiments of the present invention a display light source illumination level may be adjusted according to characteristics of the displayed image, previously-displayed images, images to be displayed subsequently to the displayed image or combinations thereof. In these embodiments, a display light source illumination level may be varied according to image characteristics. In some embodiments, these image characteristics may comprise image luminance levels, image chrominance levels, image histogram characteristics and other image characteristics.

Once image characteristics have been ascertained, the light source (backlight) illumination level may be varied to enhance one or more image attributes. In some embodiments, the light source level may be decreased or increased to enhance contrast in darker or lighter image regions. A light source illumination level may also be increased or decreased to increase the dynamic range of the image. In some embodiments, the light source level may be adjusted to optimize power consumption for each image frame.

When a light source level has been modified, for whatever reason, the code values of the image pixels can be adjusted using a tone-scale adjustment to further improve the image. If the light source level has been reduced to conserve power, the pixel values may be increased to regain lost brightness. If the light source level has been changed to enhance contrast in a specific luminance range, the pixel values may be adjusted to compensate for decreased contrast in another range or to further enhance the specific range.

Figure 13:
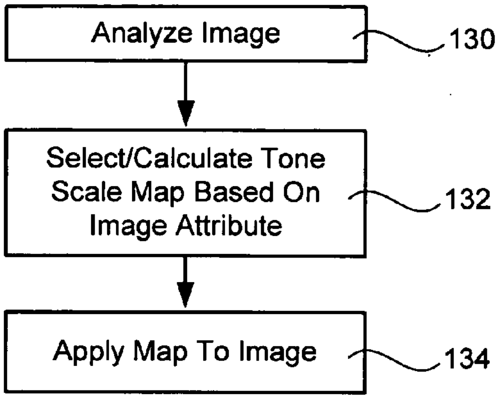
FIG. 13 is a flow chart showing an exemplary image dependent tone scale mapping method.

In some embodiments of the present invention, as illustrated in FIG. 13, image tone scale adjustments may be dependent upon image content. In these embodiments, an image may be analyzed 130 to determine image characteristics. Image characteristics may comprise luminance channel characteristics, such as an Average Picture Level (APL), which is the average luminance of an image; a maximum luminance value; a minimum luminance value; luminance histogram data, such as a mean histogram value, a most frequent histogram value and others; and other luminance characteristics. Image characteristics may also comprise color characteristics, such as characteristic of individual color channels (e.g., R, G & B in an RGB signal). Each color channel can be analyzed independently to determine color channel specific image characteristics. In some embodiments, a separate histogram may be used for each color channel. In other embodiments, blob histogram data which incorporates information about the spatial distribution of image data, may be used as an image characteristic. Image characteristics may also comprise temporal changes between video frames.

Once an image has been analyzed 130 and characteristics have been determined, a tone scale map may be calculated or selected 132 from a set of pre-calculated maps based on the value of the image characteristic. This map may then be applied 134 to the image to compensate for backlight adjustment or otherwise enhance the image.

Figure 14:
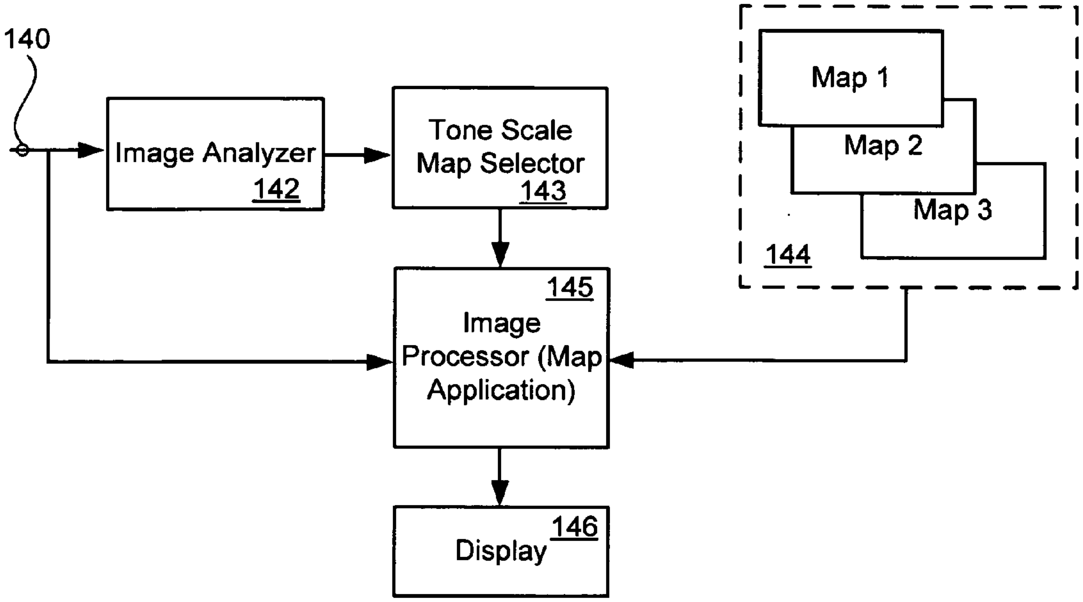
FIG. 14 is a diagram showing exemplary image dependent tone scale selection embodiments.

Some embodiments of the present invention may be described in relation to FIG. 14. In these embodiments, an image analyzer 142 receives an image 140 and determines image characteristics that may be used to select a tone scale map. These characteristics are then sent to a tone scale map selector 143, which determines an appropriate map based on the image characteristics. This map selection may then be sent to an image processor 145 for application of the map to the image 140. The image processor 145 will receive the map selection and the original image data and process the original image with the selected tone scale map 144 thereby generating an adjusted image that is sent to a display 146 for display to a user. In these embodiments, one or more tone scale maps 144 are stored for selection based on image characteristics. These tone scale maps 144 may be pre-calculated and stored as tables or some other data format. These tone scale maps 144 may comprise simple gamma conversion tables, enhancement maps created using the methods described above in relation to FIGS. 5, 7, 10 & 11 or other maps.

Figure 15:
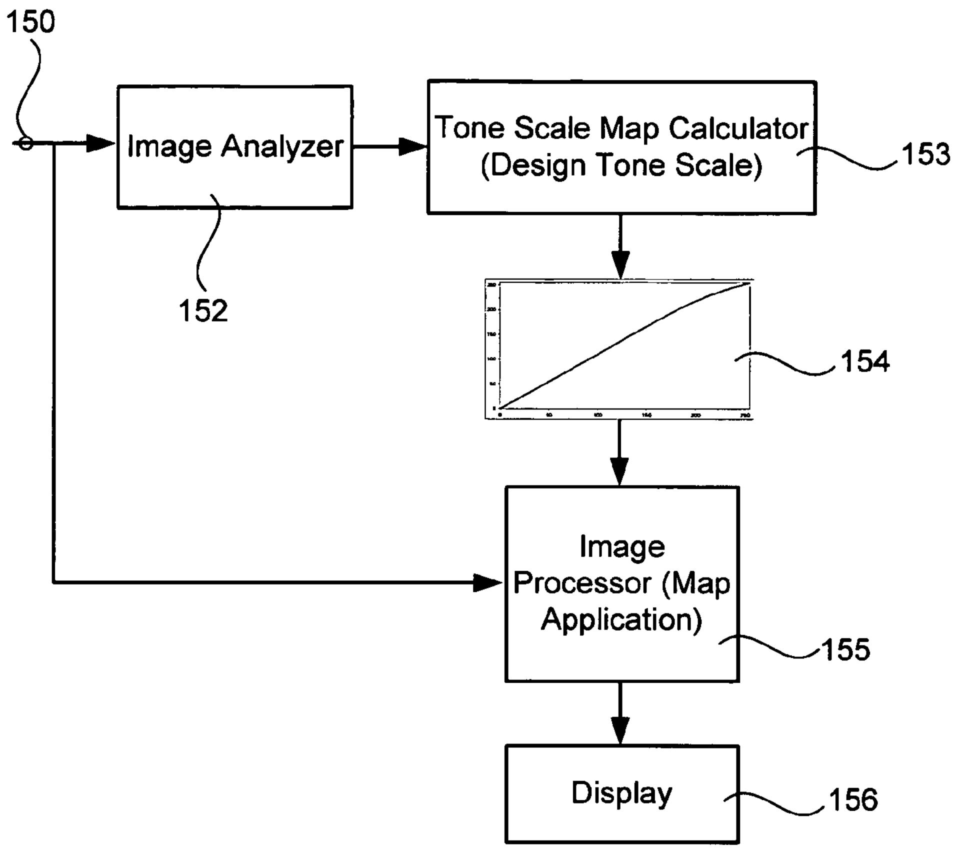
FIG. 15 is a diagram showing exemplary image dependent tone scale map calculation embodiments.

Some embodiments of the present invention may be described in relation to FIG. 15. In these embodiments, an image analyzer 152 receives an image 150 and determines image characteristics that may be used to calculate a tone scale map. These characteristics are then sent to a tone scale map calculator 153, which may calculate an appropriate map based on the image characteristics. The calculated map may then be sent to an image processor 155 for application of the map to the image 150. The image processor 155 will receive the calculated map 154 and the original image data and process the original image with the tone scale map 154 thereby generating an adjusted image that is sent to a display 156 for display to a user. In these embodiments, a tone scale map 154 is calculated, essentially in real-time based on image characteristics. A calculated tone scale map 154 may comprise a simple gamma conversion table, an enhancement map created using the methods described above in relation to FIGS. 5, 7, 10 & 11 or another map.

Figure 16:
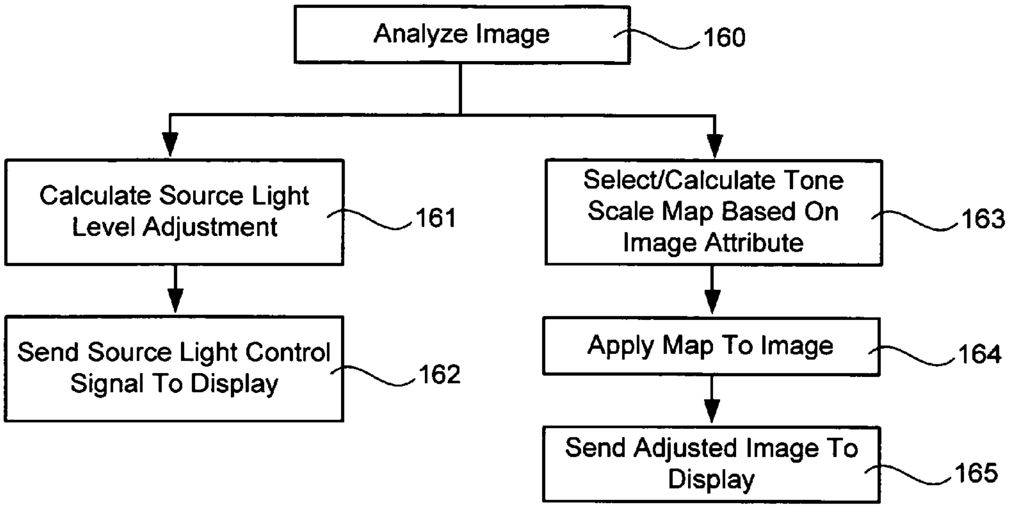
FIG. 16 is a flow chart showing embodiments comprising source light level adjustment and image dependent tone scale mapping.

Further embodiments of the present invention may be described in relation to FIG. 16. In these embodiments a source light illumination level may be dependent on image content while the tone scale map is also dependent on image content. However, there may not necessarily be any communication between the source light calculation channel and the tone scale map channel.

In these embodiments, an image is analyzed 160 to determine image characteristics required for source light or tone scale map calculations. This information is then used to calculate a source light illumination level 161 appropriate for the image. This source light data is then sent 162 to the display for variation of the source light (e.g. backlight) when the image is displayed. Image characteristic data is also sent to a tone scale map channel where a tone scale map is selected or calculated 163 based on the image characteristic information. The map is then applied 164 to the image to produce an enhanced image that is sent to the display 165. The source light signal calculated for the image is synchronized with the enhanced image data so that the source light signal coincides with the display of the enhanced image data.

Figure 17:
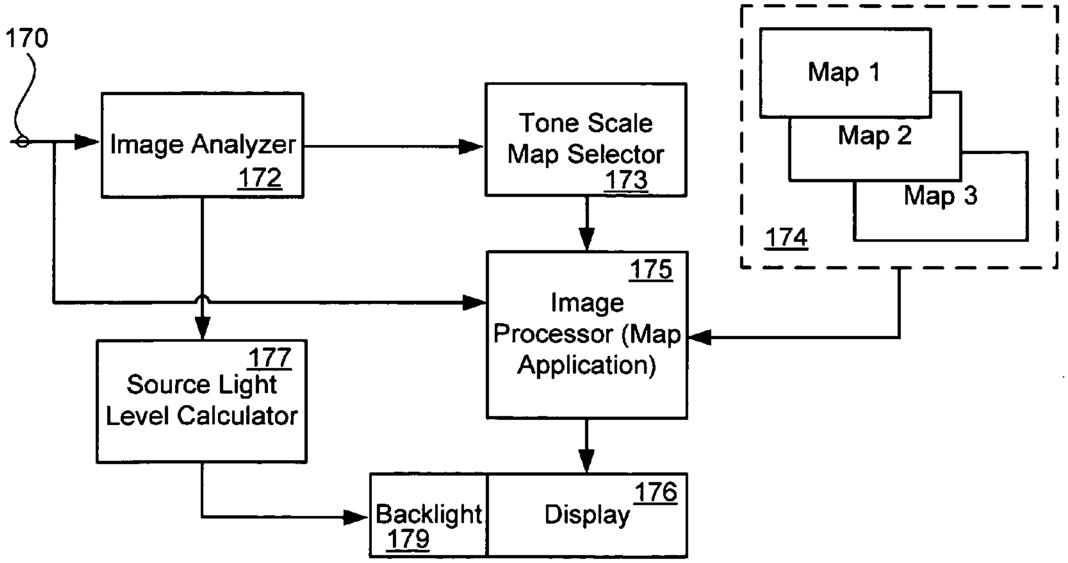
FIG. 17 is a diagram showing exemplary embodiments comprising a source light level calculator and a tone scale map selector.

Some of these embodiments, illustrated in FIG. 17 employ stored tone scale maps which may comprise a simple gamma conversion table, an enhancement map created using the methods described above in relation to FIGS. 5, 7, 10 & 11 or another map. In these embodiments, an image 170 is sent to an image analyzer 172 to determine image characteristics relevant to tone scale map and source light calculations. These characteristics are then sent to a source light calculator 177 for determination of an appropriate source light illumination level. Some characteristics may also be sent to a tone scale map selector 173 for use in determining an appropriate tone scale map 174. The original image 170 and the map selection data are then sent to an image processor 175 which retrieves the selected map 174 and applies the map 174 to the image 170 to create an enhanced image. This enhanced image is then sent to a display 176, which also receives the source light level signal from the source light calculator 177 and uses this signal to modulate the source light 179 while the enhanced image is being displayed.

Figure 18:
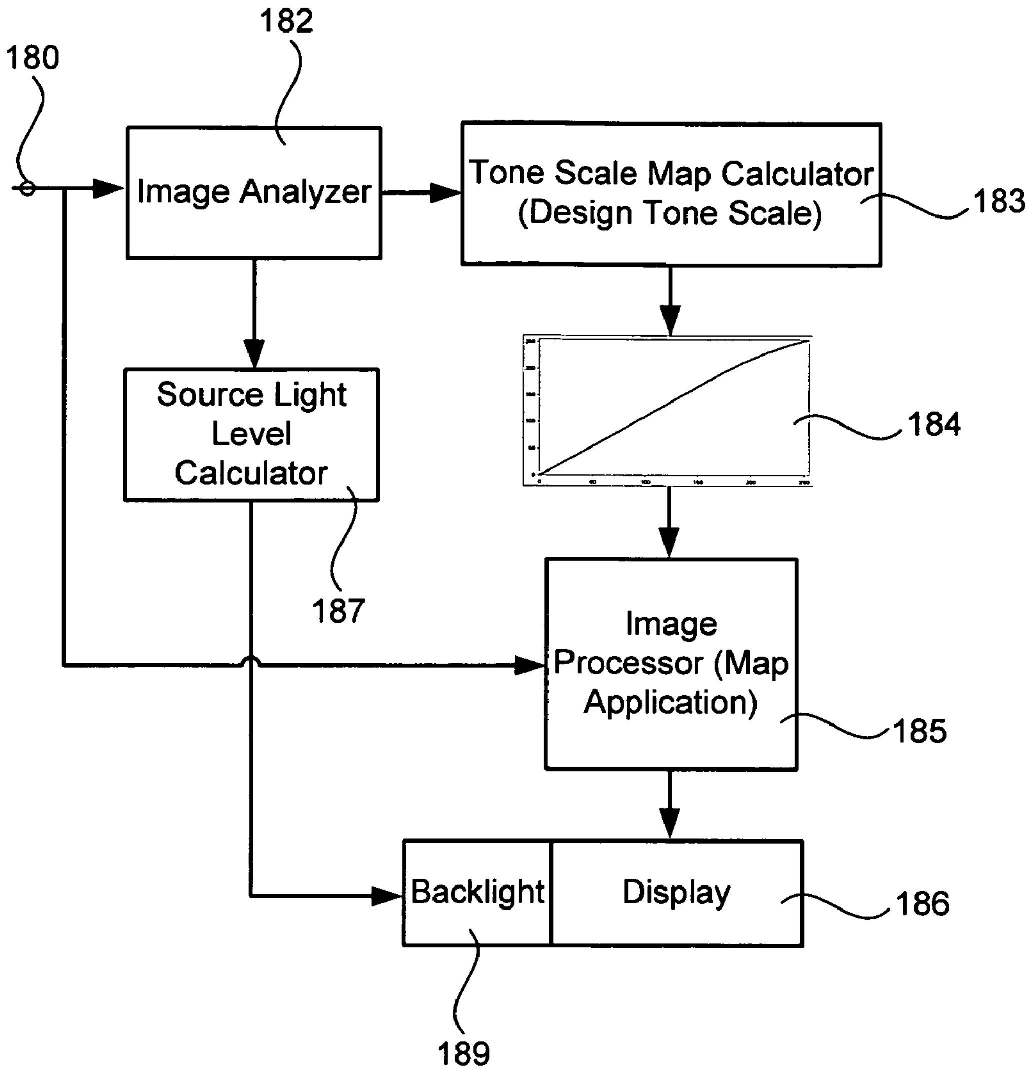
FIG. 18 is a diagram showing exemplary embodiments comprising a source light level calculator and a tone scale map calculator.

Some of these embodiments, illustrated in FIG. 18 may calculate a tone scale map on-the-fly. These maps may comprise a simple gamma conversion table, an enhancement map created using the methods described above in relation to FIGS. 5, 7, 10 & 11 or another map. In these embodiments, an image 180 is sent to an image analyzer 182 to determine image characteristics relevant to tone scale map and source light calculations. These characteristics are then sent to a source light calculator 187 for determination of an appropriate source light illumination level. Some characteristics may also be sent to a tone scale map calculator 183 for use in calculating an appropriate tone scale map 184. The original image 180 and the calculated map 184 are then sent to an image processor 185 which applies the map 184 to the image 180 to create an enhanced image. This enhanced image is then sent to a display 186, which also receives the source light level signal from the source light calculator 187 and uses this signal to modulate the source light 189 while the enhanced image is being displayed.

Figure 19:
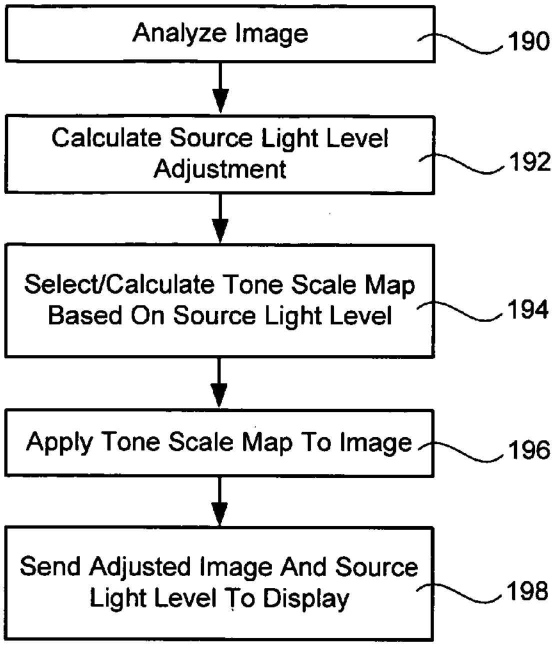
FIG. 19 is a flow chart showing embodiments comprising source light level adjustment and source-light level-dependent tone scale mapping.

Some embodiments of the present invention may be described with reference to FIG. 19. In these embodiments, an image is analyzed 190 to determine image characteristics relative to source light and tone scale map calculation and selection. These characteristics are then used to calculate 192 a source light illumination level. The source light illumination level is then used to calculate or select a tone scale adjustment map 194. This map is then applied 196 to the image to create an enhanced image. The enhanced image and the source light level data are then sent 198 to a display.

Figure 20:
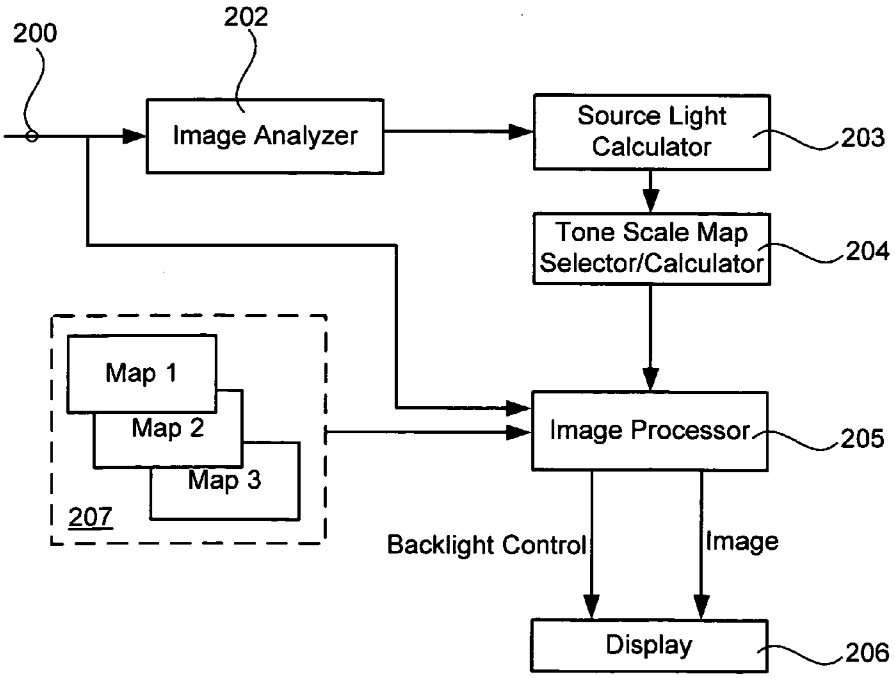
FIG. 20 is a diagram showing embodiments comprising a source light level calculator and source-light level-dependent tone scale calculation or selection.

An apparatus used for the methods described in relation to FIG. 19 may be described with reference to FIG. 20. In these embodiments, an image 200 is received at an image analyzer 202, where image characteristics are determined. The image analyzer 202 may then send image characteristic data to a source light calculator 203 for determination of a source light level. Source light level data may then be sent to a tone scale map selector or calculator 204, which may calculate or select a tone scale map based on the light source level. The selected map 207 or a calculated map may then be sent to an image processor 205 along with the original image for application of the map to the original image. This process will yield an enhanced image that is sent to a display 206 with a source light level signal that is used to modulate the display source light while the image is displayed.

In some embodiments of the present invention, a source light control unit is responsible for selecting a source light reduction which will maintain image quality. Knowledge of the ability to preserve image quality in the adaptation stage is used to guide the selection of source light level. In some embodiments, it is important to realize that a high source light level is needed when either the image is bright or the image contains highly saturated colors i.e. blue with code value 255. Use of only luminance to determine the backlight level may cause artifacts with images having low luminance but large code values i.e. saturated blue or red. In some embodiments each color plane may be examined and a decision may be made based on the maximum of all color planes. In some embodiments, the backlight setting may be based upon a single specified percentage of pixels which are clipped. In other embodiments, illustrated in FIG. 22, a backlight control algorithm may use two percentages: the percentage of pixels clipped 236 and the percentage of pixels distorted 235. Selecting a backlight setting with these differing values allows room for the tone scale calculator to smoothly roll-off the tone scale function rather than imposing a hard clip. Given an input image, the histogram of code values for each color plane is determined. Given the two percentages $P_{Clipped}$ 236 and $P_{Distorted}$235, the histogram of each color plane 221-223 is examined to determine the code values corresponding to these percentages 224-226. This gives $C_{Clipped}$(color) 228 and $C_{Distorted}$(color) 227. The maximum clipped code value 234 and the maximum distorted code value 233 among the different color planes may be used to determine the backlight setting 229. This setting ensures that for each color plane at most the specified percentage of code values will be clipped or distorted.

$$Cv_{Clipped}=\max(C_{Clipped}^{color})$$

$$Cv_{Distorted}=\max(C_{Distorted}^{color})$$

The backlight (BL) percentage is determined by examining a tone scale (TS) function which will be used for compensation and choosing the BL percentage so that the tone scale function will clip at 255 at code value $Cv_{Clipped}$ 234. The tone scale function will be linear below the value $Cv_{Distorted}$ (the value of this slope will compensate for the BL reduction), constant at 255 for code values above $Cv_{Clipped}$, and have a continuous derivative. Examining the derivative illustrates how to select the lower slope and hence the backlight power which gives no image distortion for code values below $Cv_{Distorted}$.

Figure 21:
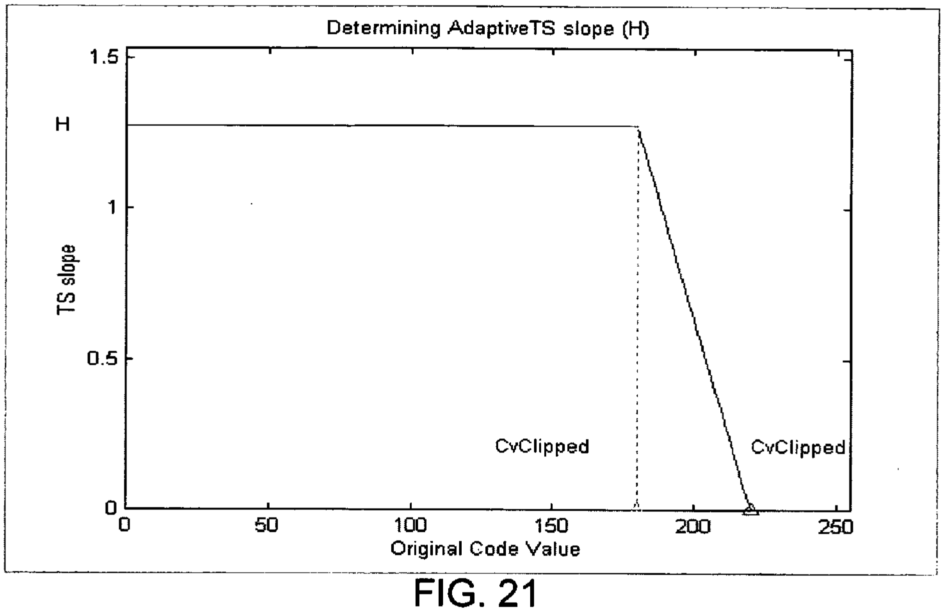
FIG. 21 is a diagram showing a plot of original image code values vs. tone scale slope.

In the plot of the TS derivative, shown in FIG. 21, the value H is unknown. For the TS to map $Cv_{Clipped}$ to 255, the area under the TS derivative must be 255. This constraint allows us to determine the value of H as below.

$$\text{Area} = H \cdot Cv_{Clipped} + \frac{1}{2} \cdot H \cdot (Cv_{Distorted} - Cv_{Clipped})$$

$$\text{Area} = \frac{1}{2} \cdot H \cdot (Cv_{Distorted} + Cv_{Clipped})$$

$$H = \frac{2 \cdot \text{Area}}{(Cv_{Distorted} + Cv_{Clipped})}$$

$$H = \frac{2 \cdot 255}{(Cv_{Distorted} + Cv_{Clipped})}$$

The BL percentage is determined from the code value boost and display gamma and the criteria of exact compensation for code values below the Distortion point. The BL ratio which will clip at $Cv_{Clipped}$ and allow a smooth transition from no distortion below $Cv_{Distorted}$ is given by:

$$BacklightRatio = \left(\frac{(CvDistorted + CvClipped)}{2 \cdot 255}\right)^{\gamma}$$

Additionally to address the issue of BL variation, an upper limit is placed on the BL ratio.

$$BacklightRatio = \text{Min}\left(\left(\frac{(CvDistorted + CvClipped)}{2 \cdot 255}\right)^{\gamma}, \text{Max}BacklightRatio\right)$$

Figure 22:
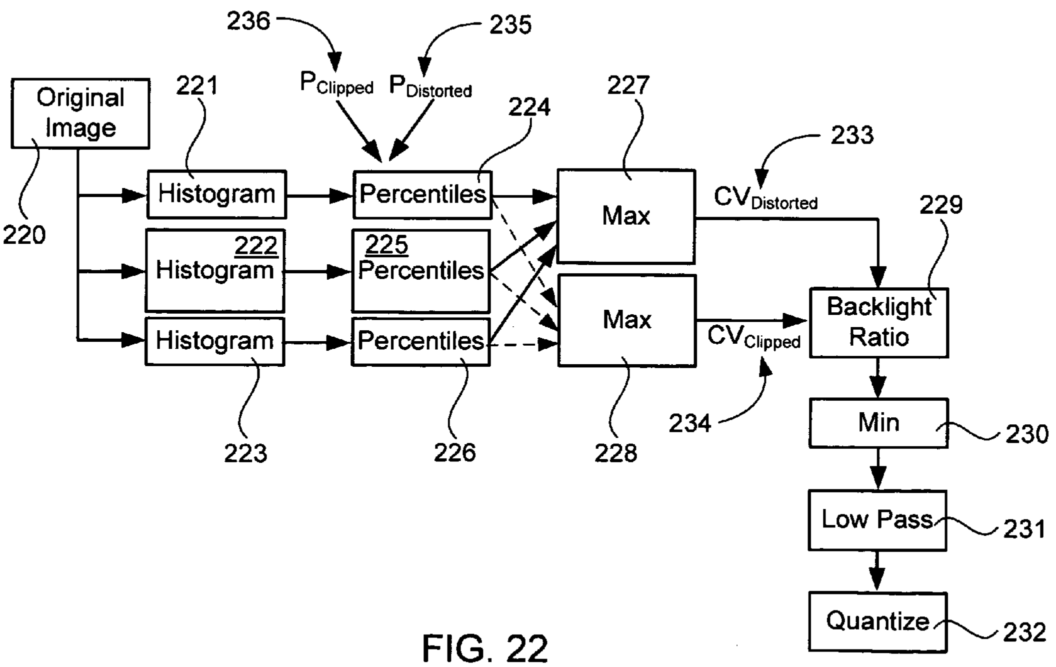
FIG. 22 is a diagram showing embodiments comprising separate chrominance channel analysis.

Temporal low pass filtering 231 may be applied to the image dependant BL signal derived above to compensate for the lack of synchronization between LCD and BL. A diagram of an exemplary backlight control algorithm is shown in FIG. 22, differing percentages and values may be used in other embodiments.

Tone scale mapping may compensate for the selected backlight setting while minimizing image distortion. As described above, the backlight selection algorithm is designed based on the ability of the corresponding tone scale mapping operations. The selected BL level allows for a tone scale function which compensates for the backlight level without distortion for code values below a first specified percentile and clips code values above a second specified percentile. The two specified percentiles allow a tone scale function which translates smoothly between the distortion free and clipping ranges.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for displaying an image, said method comprising:

a) analyzing said image, with a computing device, to determine an adjusted display source light illumination level;

b) using said adjusted display source light illumination level to determine a tone scale adjustment model that is dependent on said source light illumination level, wherein application of said tone scale adjustment model to said image adjusts pixel code values in said image thereby creating a tone scale adjusted image such that display of said tone scale adjusted image using said adjusted display source light illumination level produces similar output as said pixel code values would produce when displaying said image using a full source light illumination level;

c) applying said tone scale adjustment model to said image to produce a tone scale adjusted image; and d) displaying said adjusted image on a display using said adjusted display source light illumination level, wherein said adjusted display source light illumination level is used to control a display source light for all color channels of a display during said displaying.

2. A method as described in claim 1 wherein said applying a tone scale adjustment model comprises applying a constant gain multiplier to a first range of code values and applying a roll-off curve to a second range of code values.

3. A method as described in claim 1 wherein said applying a tone scale adjustment model comprises applying a gain adjustment to a range of code values below a maximum fidelity point (MFP) and applying a roll-off curve to code values above said MFP.

4. A method as described in claim 1 wherein said tone scale adjustment model is dependent on at least one of a display gamma, an efficiency factor and a maximum fidelity point (MFP).

5. A method as described in claim 1 wherein said applying a tone scale adjustment model comprises adjusting the code values of a first group of image pixels to increase the perceived brightness of said pixels by applying a gain factor function; and adjusting the code values of a second group of image pixels according to a transition function that transitions from said gain factor function to no gain at a maximum value point.

6. A method for adjusting an image in coordination with a display source light level, said method comprising:

a) analyzing said image, with a computing device, to determine an adjusted display source light illumination level;

b) analyzing said image to determine image characteristics;

c) generating a tone scale adjustment model based on said adjusted display source light illumination level and said image characteristics, wherein application of said tone scale adjustment model to said image adjusts pixel code values in said image thereby creating a tone scale adjusted image such that display of said tone scale adjusted image using said adjusted display source light illumination level produces similar output as said pixel code values would produce when displaying said image using a full source light illumination level;

d) applying said tone scale adjustment model to said image to produce a said tone scale adjusted image;

e) computing a high-pass image and a low-pass image from said tone scale adjusted image;

f) applying a gain map function to said high-pass image to produce an adjusted high-pass image;

g) adding said low-pass image to said adjusted high-pass image to form an enhanced image; and h) coordinating said enhanced image with said adjusted display source light illumination level for display, wherein said coordinating comprises ensuring that said adjusted display source light illumination level is used to control a display source light for all color channels of a display during display of said enhanced image.

7. A method as described in claim 6 wherein said applying a tone scale adjustment model comprises adjusting the code values of a first group of image pixels to increase the perceived brightness of said pixels by applying a gain factor function; and adjusting the code values of a second group of image pixels according to a transition function that transitions from said gain factor function to no gain at a maximum value point.

8. A method as described in claim 6 wherein said computing a high-pass image comprises low pass filtering said tone scale adjusted image to produce a low-pass image and subtracting said low-pass image from said tone scale adjusted image to produce said high-pass image.

9. A method as described in claim 6 wherein said gain function is related to the slope of the tone scale adjustment model.

10. A method as described in claim 6 wherein said gain function is proportional to the ratio of the slope of the tone scale adjustment model below a maximum fidelity point (MFP) and the slope of the tone scale adjustment model at a specific code value.

11. A method as described in claim 6 wherein said gain map function is proportional to the ratio of the slope of the tone scale adjustment model below a function transition point (FTP) and the slope of the tone scale adjustment model at a specific code value.

12. A method for adjusting an image in coordination with a display source illumination light level, said method comprising:

a) analyzing said image, with a computing device, to determine an adjusted display source light illumination level, wherein said adjusted source light illumination level is used to control a display source light level for all color channels of a display when displaying said image;

b) analyzing said image to determine a tone scale adjustment model, wherein said tone scale adjustment model is also based on said adjusted display source light illumination level;

c) applying said tone scale adjustment model to said image to produce a tone scale adjusted image;

d) computing a high-pass image and a low-pass image from said tone scale adjusted image;

e) applying a gain map function to said high-pass image to produce an adjusted high-pass image; and f) adding said low-pass image to said adjusted high-pass image to form an enhanced image.

13. A method as described in claim 12 wherein said applying a tone scale adjustment model comprises adjusting the code values of a first group of image pixels to increase the perceived brightness of said pixels by applying a gain factor function; and adjusting the code values of a second group of image pixels according to a transition function that transitions from said gain factor function to no gain at a maximum value point.

14. A method as described in claim 12 wherein said tone scale adjustment model is dependent on said adjusted source light illumination level.

* * * * *